United States Patent
Ahti et al.

(10) Patent No.: US 7,146,705 B2
(45) Date of Patent: *Dec. 12, 2006

(54) MANUFACTURING CELL USING TOOLING APPARATUS

(75) Inventors: Robert Allan Ahti, Hillsborough, NH (US); Christian Dupuis, Cincinnati, OH (US); Larisa Alexandra Elman, Swampscott, MA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/182,476

(22) Filed: Jul. 15, 2005

(65) Prior Publication Data

US 2005/0262683 A1 Dec. 1, 2005

Related U.S. Application Data

(63) Continuation of application No. 10/370,960, filed on Feb. 20, 2003, now Pat. No. 6,993,821.

(60) Provisional application No. 60/437,236, filed on Dec. 30, 2002, provisional application No. 60/437,238, filed on Dec. 30, 2002, provisional application No. 60/437,497, filed on Dec. 30, 2002.

(51) Int. Cl.
*B23P 23/00* (2006.01)
*B23Q 3/06* (2006.01)

(52) U.S. Cl. .................... 29/563; 29/33 P; 409/219; 269/88; 269/900; 269/309; 269/902; 269/99; 269/303; 269/305; 269/315; 269/319; 269/297

(58) Field of Classification Search ............ 29/563, 29/33 P; 409/219, 225; 269/88, 900, 309, 269/329, 87.2, 902, 268, 99, 93–94, 303–306, 269/315–319, 297–301, 291; 33/568, 573; 279/152–154; 408/103; 198/345.3, 465.1

See application file for complete search history.

(56) References Cited

U.S. PATENT DOCUMENTS

| | | |
|---|---|---|
| 1,329,728 A | 2/1920 | Sovereign |
| 2,369,425 A | 2/1945 | Becker |
| 2,422,773 A | 6/1947 | Colwill |
| 2,625,861 A | 1/1953 | Swanson |
| 2,676,413 A | 4/1954 | Wharton et al. |
| 2,995,962 A | 8/1961 | Dietz |
| 3,194,548 A | 7/1965 | Zwick |
| 3,681,834 A | 8/1972 | Seidenfaden |
| 3,712,606 A | 1/1973 | Cole |
| 3,766,046 A | 10/1973 | Flint |
| 3,824,744 A | 7/1974 | Petrant |
| 4,140,305 A | 2/1979 | Rabin |
| 4,302,144 A | 11/1981 | Hallqvist |
| 4,340,211 A | 7/1982 | Chiappetti |
| 4,351,516 A | 9/1982 | Ersay et al. |
| 4,382,215 A | 5/1983 | Barlow et al. |
| 4,445,678 A | 5/1984 | George |
| 4,540,164 A | 9/1985 | Shade, Jr. |
| 4,566,169 A | 1/1986 | Vesely |
| 4,583,631 A * | 4/1986 | Yonezawa et al. ....... 198/345.3 |
| 4,669,227 A | 6/1987 | Treppner |
| 4,735,404 A | 4/1988 | Blumle |
| 4,765,531 A | 8/1988 | Ricketson et al. |
| 4,790,695 A | 12/1988 | Abernathy |
| 4,829,720 A | 5/1989 | Cavalieri |
| 4,834,358 A | 5/1989 | Okolischan et al. |
| 4,928,939 A | 5/1990 | Bell et al. |
| 5,056,766 A | 10/1991 | Engibarov |
| 5,060,920 A | 10/1991 | Engibarov |
| 5,141,213 A | 8/1992 | Chern |
| 5,174,715 A | 12/1992 | Martin |
| 5,312,154 A | 5/1994 | Woodall |
| 5,493,762 A | 2/1996 | Abdiou et al. |
| 5,497,980 A | 3/1996 | Chick |
| 5,501,437 A | 3/1996 | Kisslig |
| 5,516,086 A | 5/1996 | Tankersley |
| 5,582,397 A | 12/1996 | Lanvin |
| 5,667,209 A | 9/1997 | Lenzkes |
| 5,676,359 A | 10/1997 | Feltrin |
| 5,788,225 A | 8/1998 | Iwata et al. |
| 5,869,194 A | 2/1999 | Dwyer |
| 5,931,726 A | 8/1999 | Peters |
| 5,941,513 A | 8/1999 | Moilanen et al. |

| | | | |
|---|---|---|---|
| 6,000,688 A | 12/1999 | Giangrasso | |
| 6,032,348 A | 3/2000 | Haas et al. | |
| 6,062,553 A | 5/2000 | Strehl | |
| 6,068,541 A | 5/2000 | Dwyer | |
| 6,126,158 A | 10/2000 | Engibarov | |
| 6,139,412 A | 10/2000 | Dwyer | |
| 6,158,728 A | 12/2000 | Smith | |
| 6,161,825 A | 12/2000 | Webster et al. | |
| 6,179,279 B1 | 1/2001 | Asai et al. | |
| 6,272,956 B1 | 8/2001 | Schuettel | |
| 6,273,408 B1 | 8/2001 | Moilanen et al. | |
| 6,364,302 B1 | 4/2002 | Ausilio | |
| 6,435,497 B1 | 8/2002 | Borter | |
| 6,490,899 B1 | 12/2002 | Berthelet et al. | |
| 6,681,464 B1 | 1/2004 | Dupuis et al. | |
| 6,993,821 B1* | 2/2006 | Ahti et al. | 29/563 |
| 2001/0045695 A1 | 11/2001 | Andronica | |
| 2004/0171330 A1* | 9/2004 | Whitmarsh et al. | 451/28 |
| 2005/0152758 A1* | 7/2005 | Elman et al. | 409/131 |

FOREIGN PATENT DOCUMENTS

| | | |
|---|---|---|
| DE | 4135418 | 5/1993 |
| DE | 4139669 A1 | 6/1993 |
| EP | 0 203 888 A1 | 5/1986 |
| EP | 0 924 032 A | 6/1999 |

OTHER PUBLICATIONS

U.S. Appl. No. 10/370,969, filed Feb. 20, 2003, Ahti et al.
U.S. Appl. No. 10/370,869, filed Feb. 20, 2003, Elman et al.
U.S. Appl. No. 10/370,868, filed Feb. 20, 2003, Dupuis et al.

* cited by examiner

*Primary Examiner*—Erica Cadugan

(74) *Attorney, Agent, or Firm*—Daniel F. Nesbitt; Hasse & Nesbitt LLC

(57) ABSTRACT

A manufacturing cell having a plurality of work stations, where at least one of the work station comprises a metalworking machine, and where at least one metalworking machine is provided with a modular tooling apparatus. The modular tooling apparatus consists of a base having one or more attachment surfaces, and one or more inserts that can be inserted semi-permanently to the attachment surfaces. The attachment surface is typically a pocket in the surface of the base. The insert has a workpiece support feature that can support and/or secure the workpiece into the proper position and orientation for machining. The base, pockets and inserts are configured to provide a characteristic location and orientation for the workpiece relative to the base, and to the metalworking machine. The modular tooling apparatus permits machining a family of workpiece members that are related but different in detail, by inserting an insert member from the family of inserts to properly position and orient the corresponding workpiece member, without needing to change, disconnect, or move the base tooling. The invention also provides a process for performing a plurality of metalworking operations on workpieces, employing the manufacturing cell described hereinabove.

16 Claims, 22 Drawing Sheets

MANUFACTURING CELL USING TOOLING APPARATUS

CROSS-REFERENCE TO RELATED APPLICATIONS

This application is a continuation of U.S. patent application Ser. No. 10/370,960, filed on Feb. 20, 2003, now U.S. Pat. No. 6,993,821, incorporated herein by reference, which claims the benefit of U.S. Provisional Application No. 60/437,236, filed Dec. 30, 2002; U.S. Provisional Application No. 60/437,238, filed Dec. 30, 2002; and U.S. Provisional Application No. 60/437,497, filed Dec. 30, 2002.

FIELD OF THE INVENTION

The invention relates to the field of tooling for metalworking operations and tooling systems for metalworking operations, and in particular, to manufacturing cells comprising a plurality of metalworking operations clustered together in adjacent locations on a factory floor.

BACKGROUND OF THE INVENTION

The development of metalworking machines was one of the key factors in the Industrial Revolution that began around the turn of the nineteenth century. This was a class of machine that could make almost anything, including reproducing itself. Researchers in manufacturing processes soon realized that more efficient metalworking machines would reduce the manufacturing cost of whatever products were being made. Thus, great effort was devoted toward understand the various metalworking processes, to increase metal cutting rates, and the like. Better cutting tools were developed. More powerful metalworking machines were developed. Manufacturing engineers came to realize that the most efficient metal cutting operations were those in which the cutting tools were worn out in a surprisingly short time; cutting tools became expendable items in the costs of a manufacturing operation.

As a result of the considerable research devoted to metal cutting operations, the time required for such operations was steadily reduced. While further efforts in this direction will undoubtedly reduce manufacturing time, one can ponder whether the point of diminishing returns has been reached. Researchers in manufacturing engineering began to address this matter many years ago. One researcher found that metal cutting accounted for less than 20% of the time that a part spent in a manufacturing plant. Most of the remaining time was spent awaiting the next manufacturing operation. This realization led to development of dedicated tooling that would be used for the manufacture of just one type of part, but with a reduced time for changing workpieces. It also led to more sophisticated plant layouts, so that the parts flowed through a factory in a logical fashion. Cellular manufacturing was developed. Under this concept, several different manufacturing machines, together with necessary accessory equipment, were clustered in one area of a factory. Thus, a batch of parts could go from incoming raw material to virtually complete parts with few, if any, excursions to other locations where manufacturing operations were performed. Time required for shipping a batch of parts around the plant was significantly reduced. Time spent trying to find parts that had been lost during intra-factory shipment was also reduced.

Managers of manufacturing enterprises began to keep track of work in progress, and to recognize the substantial investment that work in progress represents. Such efforts led to decreasing the number of components kept in inventory for subsequent manufacturing or assembly operations, and to decreasing the inventories of finished products awaiting shipment. The favored size for batches of parts became smaller. While such trends represent reduction in overall costs of manufacturing, such trends also placed pressure on manufacturing operations to change tooling between different manufacturing processes more quickly. The combination of smaller batch size and more widespread use of manufacturing cells has accentuated the need for reducing the time required for changeover of tooling.

Metalworking frequently involves precision machining of workpieces, often within tolerances of a few mils. (One mil is 0.001 inch, or 25 micrometers.) One of the essential prerequisites of precision machining is rigid support of the workpiece. In conventional metalworking practice, dedicated tooling to hold a particular workpiece for the metalworking operation is provided. Such dedicated tooling must provide rigid support for the workpiece.

A metalworking operation can involve the machining of families of workpieces of the same general, proportional shape, but different in size and dimensions. Typically, a family of dedicated holding devices is required for a family of workpiece members. While some parts in a workpiece family can be very small, and the associated dedicated tooling can be manipulated and carried by hand, other workpieces and their dedicated tooling can be much larger, requiring mechanical assistance (e.g., a crane) to lift, carry and position the dedicated tooling devices.

Dedicated tooling is designed to hold one workpiece family member in a precise location and position for the metalworking operation. The alignment of the dedicated tooling and the workpiece it holds to the metalworking machine must be exact, and often requires significant setup time to ensure proper alignment with the metalworking machine. Achieving such alignment is a trial-and-error process, generally requiring repeated steps of tapping the tooling to move it a small distance, tightening the bolts used to secure it in place, and then checking the alignment using dial indicators or the like. The critical nature of this process typically requires attention by the most highly skilled workers in the manufacturing facility. Often, trial parts of the workpiece must be test worked, with minute adjustments of the dedicated tooling to the worktable, to ensure the metalworking operation machines the workpiece properly.

When a metalworking facility needs to machine a variety of members of a workpiece family, there can be significant amounts of production time lost in tooling changeover, in disassembling tooling used on the first workpiece, retrieving the dedicated tooling for the next workpiece, and then installing and aligning the retrieved dedicated tooling, etc. Changing the tooling from that required for one workpiece to that required for another similar workpiece is frequently a major factor in the cost for operating a metalworking facility, particularly when business conditions in the industry can necessitate small production lot sizes.

In addition, to machine a family of workpieces that are similar in size but different in detail, equivalent families of dedicated tooling must be manufactured. Because each set of dedicated tooling must accept and secure the workpiece in generally two or more places for proper positioning and alignment, these dedicated tools can be complex and expensive.

Considerable savings in manufacturing costs can be achieved by simplifying the tooling changeover process. Where a plurality of metalworking machines is used in a manufacturing cell, the need to simplify the tooling changeover process is even greater. During a tooling changeover, it is necessary to change the tooling for each metalworking machine, but in addition, all other machines in the cell are typically idle while the tooling on any one machine is being changed.

The issues discussed hereinabove are well known to those skilled in the metalworking arts and in manufacturing engineering, and are described in Manufacturing Engineering and Technology (Fourth Edition), by Serope Kalpakjian and Steven R. Schmid.

A conventional manufacturing cell 1 is shown in its general configuration in FIG. 21. The manufacturing cell has two numerically controlled machining centers, shown at 2 and 3, inspection equipment, shown at 4, a robot for manipulating workpieces, shown at 5 and a control system, shown at 6. Metalworking machines identified as machining centers typically possess the functional attributes of a milling machine, in that a workpiece is moved past a rotating cutting tool, and additionally possess attributes particularly suited to automation, such as numerical control (N/C), a plurality of cutting tools housed in a magazine, and N/C means for changing cutting tools. A manufacturing cell can contain many different types of metalworking machines, and that there is no theoretical limit to the number of metalworking machines and accessories that can be included in a manufacturing cell.

A conventional milling machine 2 is illustrated in FIG. 22. The typical components of the milling machine are: base 11, column 12, head 13, knee 14, saddle 15, table 8, spindle 16 and cutting tool 17. The customary reference axes that define directions of movement and/or measurement are also shown in FIG. 22. Both the manufacturing cell shown in FIG. 21 and the milling machine shown in FIG. 22 are known to persons skilled in the art. The selection of milling operations for the manufacturing cell shown in FIG. 21 and the metalworking machine shown in FIG. 22 was made solely for illustrating the present invention, and the selection should not be regarded as a limitation on the scope of the present invention.

Milling machines typically have a tooling means for securing the workpiece to the table (not shown in FIG. 22). The various types of conventional tooling for securing the workpiece to the table typically do not provide rapid changeover from one workpiece to the next. Conventional tooling can require substantial disassembly of the tooling to make such a changeover, and substantial time to change the tooling from that used with one member of a family of workpieces to that used with another family member. Each of these factors typically leads to extensive commitment of time by highly skilled technicians to secure the next workpiece, or the next set of tooling, to the table. Whenever a metalworking machine is idled to change either a workpiece or tooling, it cannot perform its intended metalworking function. In the context of a manufacturing cell, where idling any one metalworking machine in the cell can idle other such machines in the cell, these deficiencies are particularly important. The present invention addresses these deficiencies, particularly with respect to manufacturing cells.

BRIEF DESCRIPTION OF THE INVENTION

The present invention provides a manufacturing cell for performing a plurality of metalworking operations on a workpiece, wherein the manufacturing cell comprises a plurality of work stations, and wherein at least one work station comprises a metalworking machine and a modular tooling apparatus secured to a table of the metalworking machine. The modular tooling apparatus comprises a base comprising a means for securing the base to the metalworking machine and an attachment surface comprising a locating feature, and an insert associated with the attachment surface, the insert comprising a locating feature, and a workpiece support feature on a surface thereof. The locating feature on the insert is configured to associate with the locating feature of the pocket, thereby defining a location of the workpiece support feature relative to the base.

The present invention also provides a manufacturing cell for performing a plurality of metalworking operations on a workpiece, wherein the manufacturing cell comprises a plurality of work stations, and wherein at least one work station comprises a metalworking machine comprising a table, and a modular tooling apparatus secured to the table of the metalworking machine. The modular tooling apparatus comprises a base comprising: a securement for securing the base to a table of the metalworking machine and at least first and second pockets therein, each of the pockets having a locating feature on a surface thereof; and at least a first set of inserts comprising at least first and second inserts, corresponding to the first and second pockets, respectively, each of the inserts having a locating feature and a workpiece support feature on a surface thereof. The base also comprises an insert securement means for separably securing each insert in its corresponding pocket. Each insert locating feature is configured to associate with the corresponding pocket locating feature, thereby defining a location of each workpiece support feature relative to the base.

The present invention further provides a process for performing, in a manufacturing cell, a plurality of metalworking operations on a workpiece, the process comprising the steps of: providing a workpiece; providing a manufacturing cell comprising a plurality of work stations, at least one work station comprising a metalworking machine comprising a table; providing, for at least one metalworking machine, modular tooling apparatus for securing the workpiece in the metalworking machine; securing the modular tooling apparatus semi-permanently to the table of the metalworking machine; securing the workpiece in the first metalworking machine; performing a first metalworking operation on the workpiece; removing the workpiece from the first metalworking machine; securing the workpiece in the second metalworking machine; performing a second metalworking operation on the workpiece; and removing the workpiece from the second metalworking machine. The modular tooling apparatus of the process comprises: a base comprising at least first and second pockets therein, each of the pockets having a locating feature on a surface thereof; a set of inserts comprising at least first and second inserts, corresponding to the first and second pockets, respectively, each of the inserts having a locating feature and a workpiece support feature on a surface thereof; a securement for separably securing each insert in its corresponding pocket; and a means for separably securing the workpiece to the modular tooling apparatus. The locating feature on each insert is configured to associate with the locating feature in the corresponding pocket. The workpiece support features of the inserts collectively and cooperatively support the workpiece and define a location thereof relative to the modular tooling apparatus.

DETAILED DESCRIPTION OF THE INVENTION

Definitions

Figure 1:
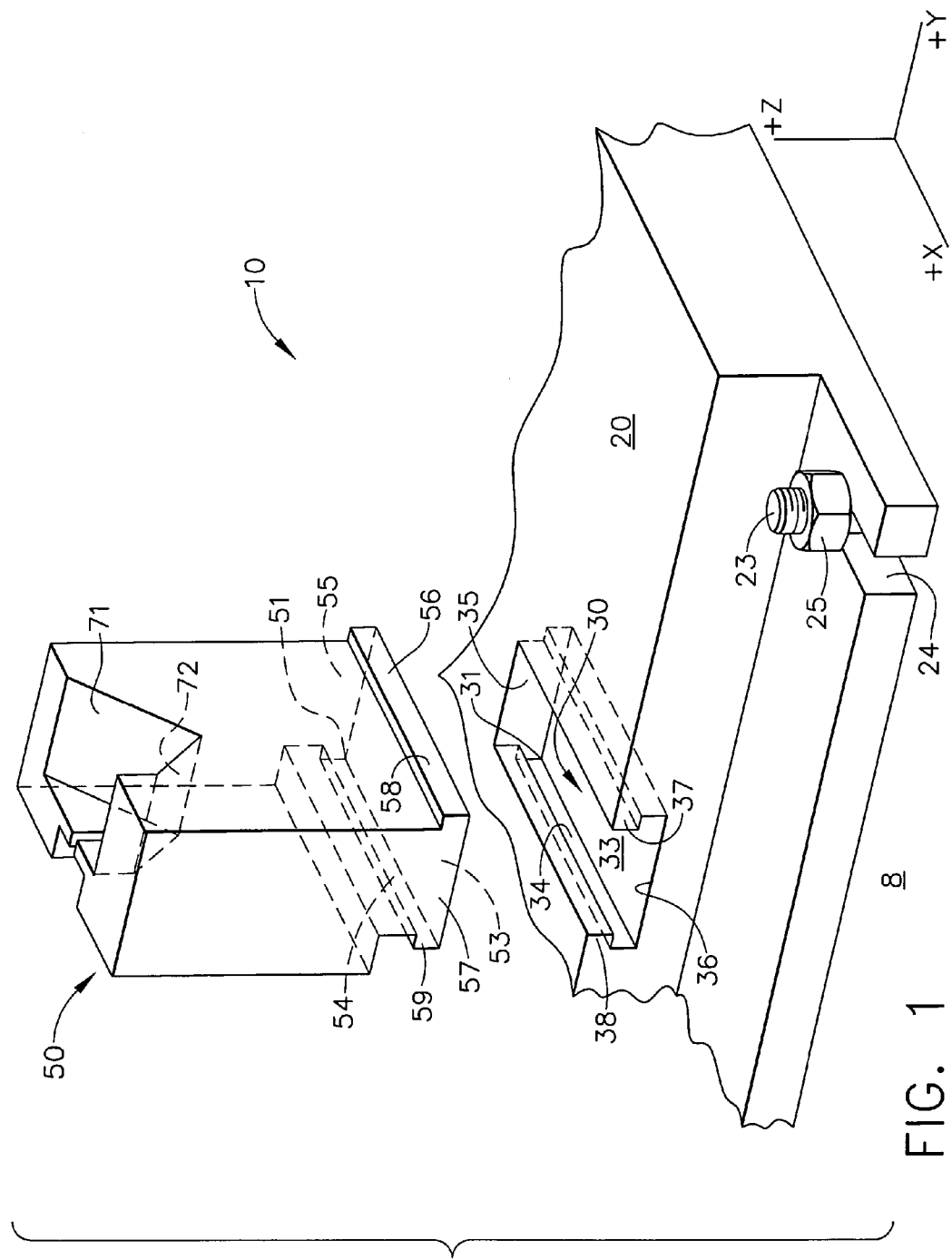
FIG. 1 shows a schematic representation of a tooling insert and a base employed therewith.

As used herein, the phrase "metalworking machine" refers to any machine for the cutting, forming, joining or otherwise processing of a metallic workpiece. The term can include, but is not limited to, a milling machine, a planer, a shaper, a drill press, a vertical turret lathe, a grinder, EDM and ECM machines, a broaching machine, a bending brake, a stamping press, and a welding apparatus. In a broad context, the term can also include such diverse forms of equipment as a lathe or a die casting machine.

As used herein, the term "tooling" refers to an apparatus for holding and supporting a workpiece while it is being cut, formed, joined or otherwise processed by a metalworking machine.

As used herein, the term "tool" refers to an apparatus used by a metalworking machine to cut, form, join or otherwise process a workpiece.

As used herein, the phrase "manufacturing cell" refers to a plurality of metalworking machines, clustered together in close proximity on a factory floor. The phrase generally comprehends accessory equipment, including but not limited to inspection equipment, materiel handling equipment, heat treatment equipment, cleaning equipment and the like, that can be employed in conjunction with the metalworking machines.

As used herein, a "set" of inserts is a plurality of inserts configured to cooperatively support a single workpiece in a modular tooling apparatus. Generally, there is a set of pockets on a base that corresponds with the set of inserts.

As used herein, a "family" is a plurality of related members. A "family" of workpieces is a plurality of workpieces that has substantially the same shape and features, though the workpieces are different in size or proportion, and are thus related but different in detail. A "family" of inserts is a plurality of inserts, or of sets of inserts, configured to hold or support members of a corresponding family of workpieces at the same position on the workpiece, and are thus related but different in detail.

As used herein, "corresponding" or similar word form refers to insert A associating with and fitting into pocket A, insert B into pocket B, etc. The term can also refer to insert A associating and supporting workpiece A, insert B associating and supporting workpiece B, etc.

As used herein, a "locating feature" is a surface or a combination of surfaces on an element configured to ensure positive positioning and/or orientation at a location with respect to the base, and with respect to the metalworking operation, with a high degree of accuracy and repeatability.

As used herein, a "location" of a workpiece support feature is precise position (in x, y and z space) and orientation (relative to x, y and z axes) relative to the base. A "location" of a workpiece that is being held in position by one or more workpiece support features is its corresponding precise position (in x, y and z space) and orientation (relative to x, y and z axes) relative to the metalworking operation.

As used herein, the term "chips" includes all forms of debris generated in a metalworking operation, including, but not limited to, chips, grinding swarf, metal particles formed in EDM, ECM and laser cutting operations, weld spatter and flux particles, and the like.

The present invention provides an improvement in metalworking operations used to manufacture metal workpieces. The improved metalworking tooling operation employs a modular tooling apparatus for performing a metalworking operation on a workpiece or a family of workpieces.

The modular tooling apparatus consists of a base having one or more attachment surfaces, and one or more inserts that can be attached semi-permanently to the attachment surface. The attachment surface is typically a pocket in the surface of the base. The insert has a workpiece support feature that can support or secure the workpiece into the proper position and orientation for machining. The base, pockets and inserts are configured to provide a characteristic location and orientation for the workpiece relative to the base, and to the metalworking machine. The modular tooling apparatus permits machining a family of workpiece members that are related in shape but different in detail, by inserting an insert member from the family of inserts to properly position and orient the corresponding workpiece member, without needing to change, disconnect, or move the base tooling.

The base comprises an attachment surface to which an insert can associate. Typically, the insert associates with the attachment surface by a mechanical engagement that at least partially and temporarily secures the insert to the base.

Figure 2:
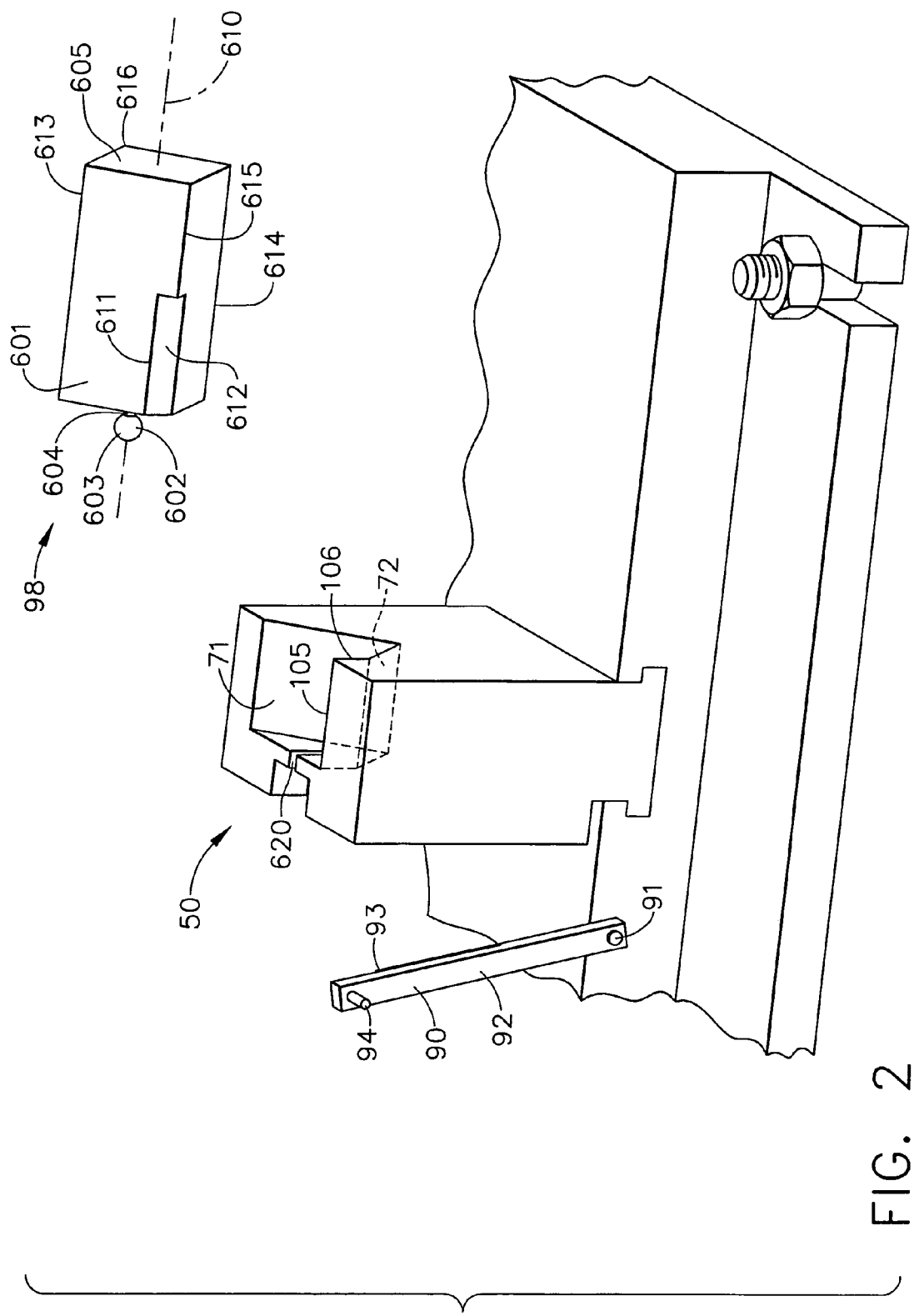
FIG. 2 shows a schematic representation of the modular tooling apparatus consisting of the insert shown in FIG. 1 installed in the base, which is also shown in FIG. 1. A securement is shown in the foreground of the Figure. A workpiece is shown in the upper right portion of the Figure.

An embodiment of a modular tooling apparatus of the invention is shown in FIGS. 1 and 2. FIG. 1 shows a modular tooling apparatus 10 comprising a base 20 having an attachment surface, shown as a pocket 30, and an insert 50 separated from the base 20. The base 20 is configured to be attached semi-permanently to a metalworking machine (not shown). The head of T-bolt 23 is secured in a T-slot in a table 8 of the metalworking machine. The shank of the T-bolt passes through a slot 24 in the base, and the T-bolt is capped with a hexagonal nut 25 that, when turned, presses downward upon the top surface of the base 20 to secure the base to the table 8. Several T-bolts are commonly employed, as is common practice in the metalworking arts. The base can be secured to the table by means well known in the art. In addition to T-bolts mentioned above, the base can be secured to the table with: standard threaded bolt downward through a slot in the base, engaging a T-nut in a slot in the table, a threaded rod with a T-nut at the bottom and a standard hexagonal nut at the top; and a C-clamp, clamping a top surface of the base with the bottom of the table; a threaded bolt engaging a tapped hole in the table; a custom-machined table into which the base slidably secures; and a cam-action clamp having a T-head rod in the T-slot of the table, whereby actuating the cam causes downward pressure against the tooling base by pulling upward against the T-head rod. Those having ordinary skill in the metalworking arts will recognize these and alternative means for attaching the base 20 the metalworking machine. The attachment of the base to the table includes the step of orienting and positioning the base whereby a reference point on the base cooperates with a reference point on the metalworking machine to define a position of the base relative to the metalworking machine. The fixed reference point can include one or more points on the base. The fixed references typically include a spherical device attached to the base 20 and a removable electronic indicating system temporarily attached to the spindle of the metalworking machine (not shown). Alternatively, a manual method of orienting and positioning the base can be employed. The manual method, well known in the machining arts, relies upon a dial indicator temporarily secured to a fixed feature of the metalworking machine while the indicator arm rests upon an appropriate linear or planar feature of the base. The table is then moved so that multiple readings are obtained from various locations of the linear or planar feature relative to the fixed feature. Those having ordinary skill in the metalworking arts will recognize these and alternative means for providing an indication of the location thereof to a control system that can be employed in operating the machine.

The base 20 can be constructed to comprise a plurality of members that are joined together semi-permanently. The members are typically comprised of non-movable members and moveable members. Non-movable members can comprise a series of distinct laminar plates, aligned and fastened together, as by bolting. The moveable member can comprise one or more of a variety of plates, hardware and devices that assist in the loading and support of the workpiece, and the discharging of the machined workpiece from the modular tooling apparatus. An example of a moveable member includes, but is not limited to, a force means such as a hydraulic or pneumatic clamp, a manual toggle clamps, a fixed workpiece support member, and a pneumatic or hydraulic ejector. A pocket located on the base can be associated with a movable member or plate of the base, or with a non-moveable member of the base, as herein after described.

The attachment surface of the base typically comprises a pocket. A pocket can be a depression in the surface of the base that is configured to receive an associating element of an insert. The pocket 30 shown in FIG. 1 has a backwall 35, a rear sidewall 34, an opposed front sidewall, and a floor 33. The sidewalls are typically parallel to each other, and perpendicular to the backwall. Each wall is typically perpendicular to the floor 33. The front and rear sidewalls have overhanging ledges 37 and 38, respectively, with a clearance recess there below.

The pocket 30 has a locating feature that comprises a plurality of locating members defined by the floor 33, the sidewall 34, and the backwall 35. These three planar locating features cooperate to identify a characteristic locating point 31.

The insert 50 has an upper portion and a lower portion 56. The lower portion 56 of the insert has a front wall 57, a backwall 55, a rear toe 59 having rear sidewall 54, a front toe 58 having a front sidewall, and a bottom 53. These features are particularly configured and oriented to associate with corresponding features of the pocket 30.

Insert 50 associates with the pocket 30 by sliding lower portion 56 through the opening 36 of pocket 30. The insert is configured to be separated from the pocket by hand, without the use of a mechanic's tool, such as a wrench or screwdriver. The insert 50 has a locating feature which comprises a plurality of locating members defined by the bottom 53, sidewall 54, and backwall 55 of the lower portion 56. Theses three planar locating features cooperate to identify a characteristic insert locating point 51. The insert can have a plurality of locating points, defined by the cooperation of one or more locating features, which can include surfaces, edges and points on the surface of the insert.

Figure 4:
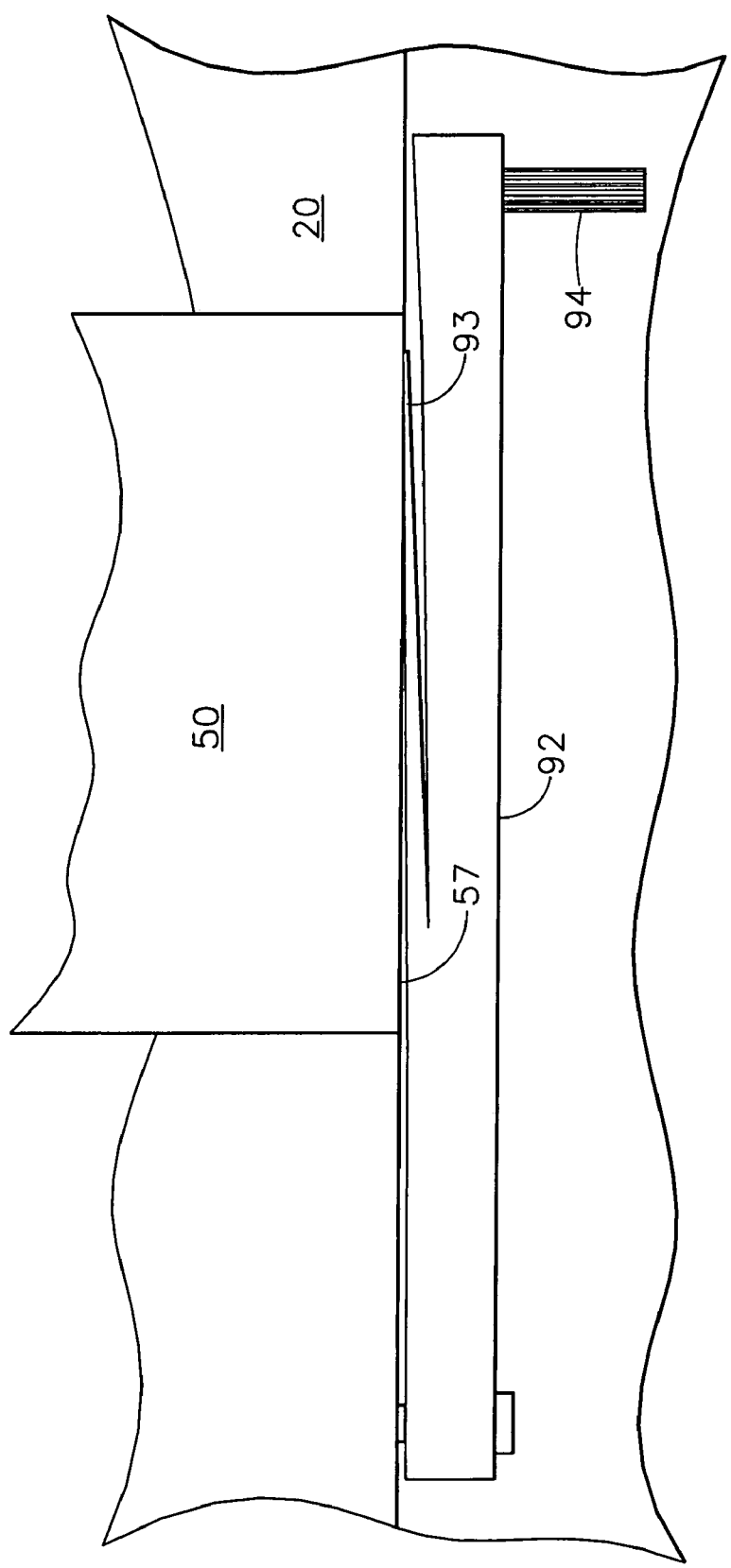
FIG. 4 shows a plan view of the securement shown in FIG. 3.

The upper portion of insert 50 has a workpiece support feature upon a surface thereof. The workpiece support feature comprises a plurality of workpiece support members defined by the confronting inclined planes 71 and 72, and the ball joint restraints 73 shown in FIG. 5. These support surfaces support corresponding surfaces on the workpiece 98 as shown in FIG. 4. Insert 50 is configured to define a location of the workpiece support feature relative to the insert locating point 51. The workpiece support members 71, 72, and 73 are precisely machined to provide characteristic positioning (in the x, y and z coordinate space) of the workpiece support feature relative to the insert locating point 51.

The extent to which the insert 50 is restrained against movement relative to the base 20 is limited by three factors: (1) the precision employed in manufacturing the associated parts, (2) the ability to place the insert in and remove it from the pocket, and (3) the ability to restrain the insert against movement in the +x direction.

The lower portion 56 is configured to fit precisely into pocket 30 whereby the locating feature of the insert and the corresponding locating feature of the pocket cooperate to define a location of the workpiece support feature relative to the base 20. The functionality of the insert and pocket arrangement is that the insert slides into the pocket to establish a precise spatial relationship therewith. Thus, the relationship between corresponding features when the insert is seated in the pocket is confronting. However, during removal and insertion of the insert relative to the pocket, the relationship between corresponding features is sliding. The sliding relationship is particularly apparent with respect to the pocket sidewalls and toe sidewall of the insert, to the clearance recess below the ledges of the pocket and the toes of the insert, and to the floor of the pocket and the bottom of the insert. The lower portion 56 of the insert 50 must be carefully constructed such that the dimensions thereof allow for a sliding relationship with the pocket 30, but with minimum movement of the insert within the pocket. For inserts having characteristic dimensions on the order of a few inches (several centimeters), the space between corresponding features is typically about one mil (one mil equals 0.001 inch, or 25 microns). The clearance between corresponding vertical surfaces is typically less than about 0.001 inch per side, per inch (1 micron per side, per millimeter) of linear dimension of that surface. In the design and construction of the insert and pocket, one can compromise between free movement and rigid positioning of the insert, thereby reasonably meeting both requirements. Dimensional tolerances appropriate to such clearances can be achieved by various grinding operations, or by reaming a hole, or by cutting a contoured surface by electrical discharge machining (EDM), using a moving wire as the cutting electrode (wire EDM).

Dimensional tolerances of the pocket 30 can be more difficult to achieve than the dimensional tolerances of the inserts. Further, accurately machining the interior corners between the front or back surfaces and adjacent side surfaces is particularly difficult. A typical solution involves the use of ground plates for the side surfaces of the pocket, and of one or more ground spacer blocks for the front, back and bottom surfaces of the pocket. In a simple form, the base is assembled from three plates that are pinned and bolted together, and separated only for maintenance of the modular tooling apparatus. A typical material for both the base and an insert is hardened tool steel, which resists many assembly methods, especially welding. The insert is then ground to fit the pocket, allowing for the clearance dimensions set forth hereinabove.

FIG. 2 shows the modular tooling apparatus 1 with the insert 50 inserted into and associated with the pocket 30. The insert 50 is restrained from movement within the pocket 30 in a plurality of directions, namely in the both z directions, both y directions, and in the −x direction. Thus, the insert is unrestrained by the pocket in the all directions except the one remaining direction, the +x direction, from which the insert 50 has been inserted.

The locating planes 33, 34, and 35 of the pocket 30 are in confronting contact with the corresponding locating planes 53, 54, and 55 of the inserted lower portion 56. Provided that these features are designed and machined precisely, the locating points 31 of the pocket and 51 of the insert become substantially co-located. Co-locating the locating points thereby defines the characteristic location of the workpiece support feature relative to the reference point of the base 20.

Figure 3:
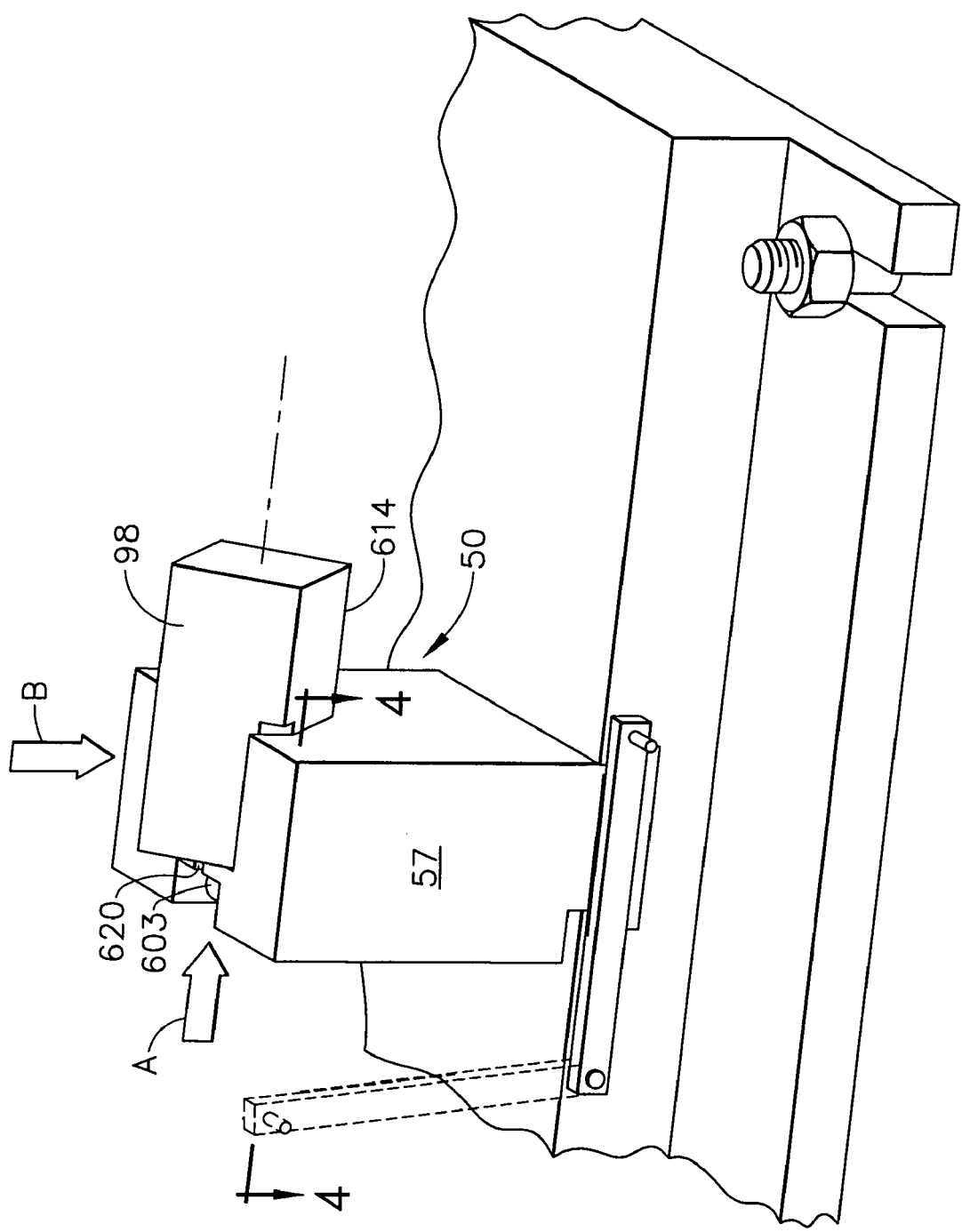
FIG. 3 shows a schematic representation of a workpiece in the modular tooling apparatus, illustrating how the workpiece can be secured in the apparatus.

In the embodiment of a modular tooling apparatus used in the present invention shown in FIG. 2, a securement 90 is associated with the modular tooling apparatus to separably secure the insert in the pocket. The securement 90 comprises a pivot 91 and a body 92 that can move pivotally from a first position where the insert can be inserted and removed from the pocket, and a second position where the securement restrains the insert from movement within the pocket in the +x direction, shown in FIG. 3. FIGS. 3 and 4 show the securement body 92 can comprise a biasing member comprising an elongated biasing member 93 that extends away from and along the wall of the body 92 confronting the insert. In the first (unsecured) position, the biasing member 93 projects into the plane of the front wall 57 of the insert. When the securement is in the second position, the biasing member 93 is forced to bend inward toward the securement body 92. Due to the resilience to bending of its material (typically a tool steel), the biasing member 93 exerts a biasing force against the front wall 57 to secure the insert in position. The securement is provided with a handle 94 to assist moving the body between positions. Typically the securement 90 is configured to be manipulated between its first and second positions without the use of a mechanic's tool.

The insert 50 also comprises a pocket orientation feature so that the insert 50 can be associated with pocket 30 in only one orientation. The pocket orientation feature comprises rear toe 59 having a height higher than that of front toe 58. As shown in FIG. 2, the rear toe 59 of lower portion 56 can enter the pocket within the corresponding clearance of the opening 36 under rear ledge 38. If the insert is turned 180°, the height of the same rear toe 59 prevents insertion within the shorter clearance of the opening under front ledge 37. This feature prevents a user of the apparatus from inserting the insert 50 improperly into pocket 30.

The insert 50 also comprises a workpiece orientation feature so that a workpiece 98 can have only one orientation when associated with the workpiece support feature of the properly-inserted insert 50. In FIG. 2, the workpiece orientation feature comprises shoulder 106 that extends upwardly from the support surface comprising workpiece support member 72. The shoulder 106 is configured to register with a flat 611 of a workpiece 98 that has been machined along edge 615 only of the workpiece body. The shoulder 106 is also configured to prevent placement of the workpiece upon the support members 71 and 72 if the workpiece is placed into the apparatus in any of the other three orientations where body edges 613, 614 or 616 confront the shoulder 106.

FIG. 2 shows a workpiece 98 separated from the insert 50. The workpiece 98 comprises a rectilinear body 601 having a square cross section, and a ball joint 602 affixed to a first end of the body. The ball joint 602 comprises a spherical head 603 adjoined to the body 601 by a cylindrical neck 604. The head 603 and neck 604 are aligned with the centerline 610 of the workpiece. The workpiece has flat 611 having a face 612 that has been machined in a prior metalworking operation along a portion of edge 615 of the body 601. The face 612 is a planar surface that lies parallel to a plane passing through workpiece edges 613 and 614. Such a workpiece can be conveniently made from square bar stock in a turning operation.

Figure 5:
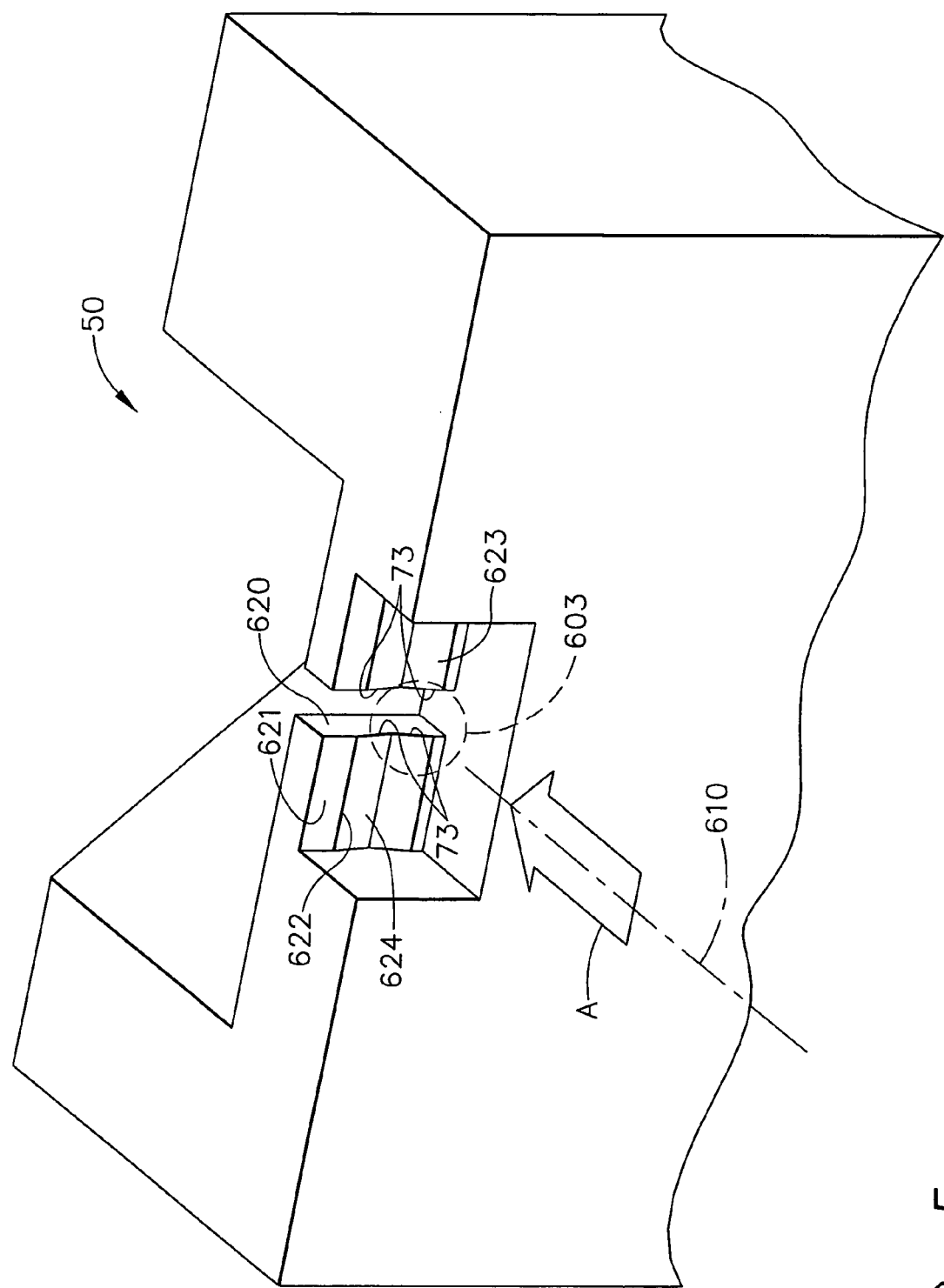
FIG. 5 shows a partial schematic view of the insert shown in FIG. 1, illustrating how the workpiece can be secured with the insert.

FIG. 4 shows the modular tooling apparatus having workpiece 98 positioned upon the workpiece support feature of insert 50, prior to the metalworking operation. The workpiece 98 is positioned onto the modular tooling apparatus by passing the neck 604 of the ball joint 602 down through the slot 620 of the insert 50 until the body, with edge 614 turned downward, rests upon the workpiece support members 71 and 72. In this position, as seen in FIG. 5, the head 603 has cleared the lower edge 622 of each of the upper head guides 621 of the insert, and can advance within the recess 624 of each of the lower head guides 623. When the workpiece is pressed forward (in the +y direction), the head 603 contacts ball joint restraints 73, and the workpiece is properly positioned.

The location of the cooperating workpiece support feature of insert 50 (workpiece support members 71, 72, and 73) defines a location of the workpiece 98 in reference to the base 20. The location of the workpiece provides a characteristic position of a reference point of the workpiece in x, y and z space, and a characteristic orientation of the workpiece (its pitch, roll, and yaw) about its x, y and z axes.

Under the forces applied by milling machines of a metalworking operation, the workpiece is prone to movement, shifting and vibration. To prevent movement of the workpiece during the metalworking operation, the workpiece is typically secured to avoid movement and/or vibration during machining. Typically, an insert is secured in a pocket whereby only one direction is unsecured by the pocket itself (that is, the position by which the insert was inserted into the pocket). Pocket and insert configurations are selected to avoid the action of forces from the metalworking operation upon the insert in that one direction. Typically, an insert and pocket will not be configured whereby the force from the metalworking operation applies a force upon the insert in the direction of the insert's insertion or removal. An insert is more typically configured whereby, when a metalworking operation exerts force upon the workpiece 98, the workpiece will exert a resulting force upon the insert that contributes to securing the insert into the pocket. That is, the force of the metalworking operation on the workpiece assists in securing the insert to the base. A secondary consideration in designing the modular tooling apparatus is minimizing the extent of forces related to clamping a workpiece that act in the one direction associated with placing the insert in its corresponding pocket.

The forces exerted upon a workpiece by a metalworking machine can require one or more force means to secure the workpiece. Any shifting, moving, flexing, or vibration of the workpiece during a metalworking operation can result in improper machining of the workpiece. An insert of the present invention can be used to position the workpiece in the proper position for the metalworking operation, and can also be used to secure the workpiece by resisting movement by virtue of its rigid attachment to the base and table, or by exerting a force upon the workpiece. The modular tooling apparatus of the invention can employ one or more means of exerting a restraining force upon the workpiece. The restraining force means is particularly important when the workpiece is flexible or bendable. Typically, the restraining force is exerted on the workpiece as close to the path of the metalworking machine as is practical, to maintain the rigidity of the workpiece during the metalworking operation.

Typically the securing force that is applied to the workpiece exerts, through the workpiece, a force upon an insert that is securing or supporting the workpiece. A securing force is typically configured whereby the force upon the insert is in a direction that contributes to securing the insert into the pocket.

A first force means can be configured to apply a force upon the head 603 of the workpiece 98 to secure the workpiece against the ball joint restraints 73. The direction of force of the first force means is shown in FIG. 5 as force A applied against head 603, shown in dashed lines. A means well known in the art can be used to exert force A upon head 603, including a pneumatic or hydraulic piston and a manual toggle clamp as described in Manufacturing Engineering and Technology (Fourth Edition), by Serope Kalpakjian and Steven R. Schmid. The manual toggle can have a spindle tip that is shaped to securely engage the head 603. Typically, the force means engages and secures (and disengages from) the head 603 of the workpiece quickly (that is, within a few seconds), and does not require a mechanic's tool to engage or disengage from the head 603. Typically, the force means is an element permanently or semi-permanently affixed to the base 20, and is configured and positioned such that force A is applied precisely upon the head 603.

Figure 6:
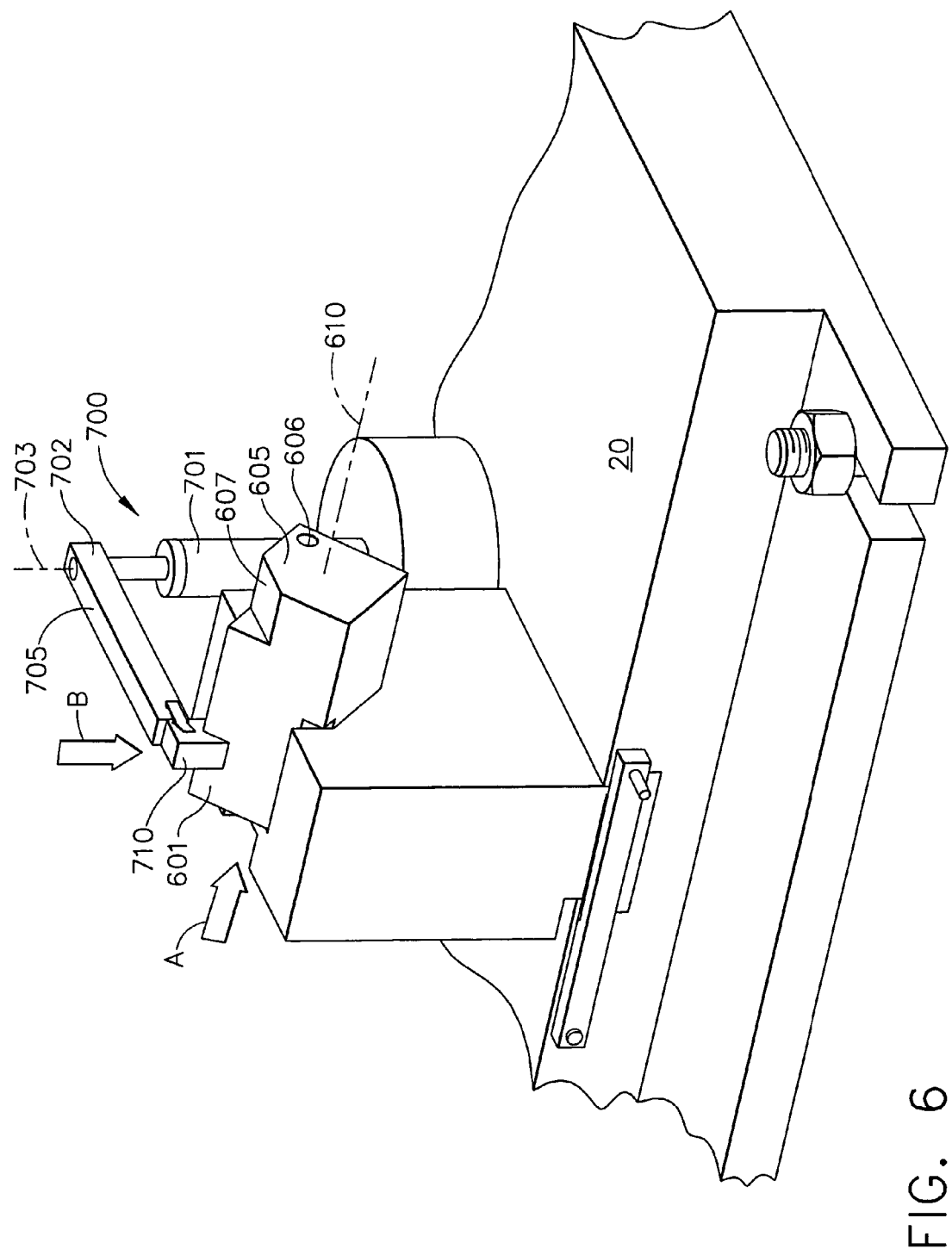
FIG. 6 shows a schematic representation of a workpiece in the modular tooling apparatus after completion of the metalworking operation, and illustrating how the workpiece can be secured in the apparatus with a movable insert of the invention.

A second force means can be configured to apply a force upon the upper surface of the body 601 along edge 613 to secure the workpiece against the workpiece support members 71 and 72. The direction of the second force means is shown in FIG. 3 as force B. A means well known in the art can be used to exert force upon body 601, including a toggle clamp having an appropriately-shaped spindle tip surface to conform with the surface of the body along edge 613, as discussed above. Another force means for applying force is a hydraulically-actuated, pivoting clamp device 700 as shown in FIG. 6, having a vertically-aligned hydraulic cylinder 701 having an arm 705 affixed to the top end 702 of the hydraulic cylinder and extending outward. The hydraulic cylinder is typically positioned upon and affixed to the base. The arm can pivot about the axis 703 of the hydraulic cylinder, and typically is configured to pivot between a securing position, as shown in FIG. 6, and a second position clear of the workpiece. The second end of the arm has a clamp 710 suspended there from. The clamp surface has a shape configured to conform with the surface shape of the body 601 when positioned thereon. After a workpiece 98 has been placed into the insert 50 upon the workpiece support member, 71 and 72, and has been secured against ball joint restraints 73 with force A, the clamp arm 705 is pivoted and locked in the securing position over the body 601, and the hydraulic cylinder 701 is activated to lower the clamp 710 down to engage the upper surface of the body 601. The hydraulic cylinder 701 can apply a directional force downward upon the clamp 710, which in turn applies force B onto the workpiece 198 to secure it in place against the workpiece support features 71 and 72 of insert 50.

Figure 7:
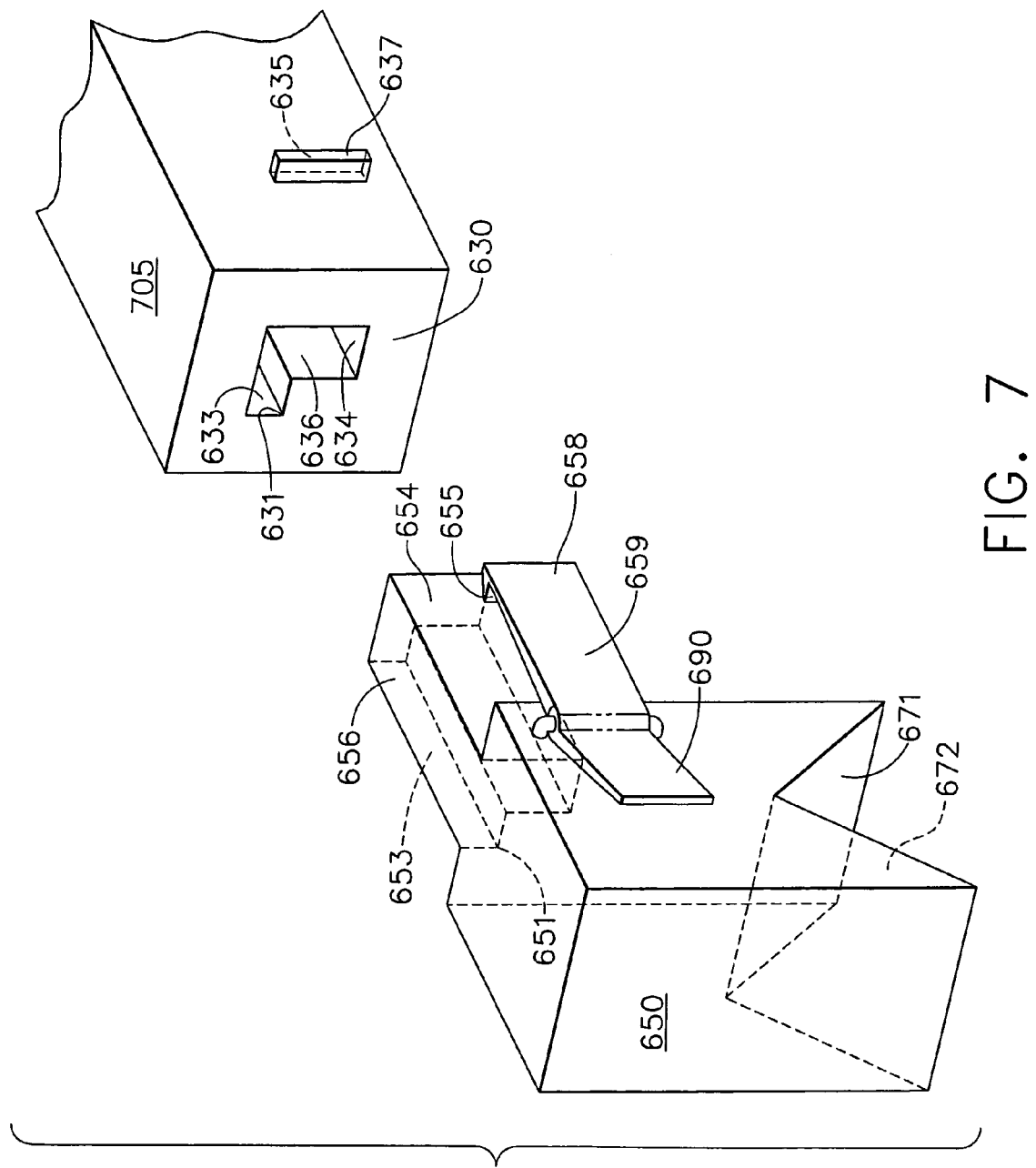
FIG. 7 shows a schematic representation of a movable tooling insert and its associated pocket on a movable member of the base.

Typically, the clamp 710 can comprise another insert 650, shown in FIG. 7, which can be used in combination with the second force B to secure the workpiece. An insert 650 is typically used when the surface features of a workpiece upon which securing force B is to be applied are characteristic of the workpiece. A characteristic workpiece can require that the contour of the surface of the workpiece support feature of the insert 650 be precisely machined to match or conform with the confronting surface of the workpiece. Unlike insert 50, insert 650 is moveable relative to the base when secured within its pocket. As shown in FIG. 7, the pivoting arm 705 has a pocket 630. The pocket 630 has an opening 636, and a plurality of connected sidewalls defining a passage having a characteristic cross-sectional shape along its length. The pocket 630 has a locating feature that comprises a plurality of locating members defined by the inner sidewalls 633 and 634, and an engaging surface 635 on the backside of catch 637. These three locating members cooperate to identify a characteristic locating point 631 of the pocket 630. The locating point is related to the locating point of the base by the configuration and positioning of the hydraulic cylinder and the pivot arm.

Insert 650 associates with the pocket 630 by sliding pin 656 through the opening 636 of pocket 630. The pin 656 comprises an elongated shaft having a shape configured to associate with the sidewalls of the pocket 630, to provide slidable confronting contact between the pin and the shaft having the precise spatial relationships described for the embodiment of the pocket 30 and insert 50 herein above. The insert 650 has a locating feature that comprises a plurality of locating members defined by the sides 653 and 654 of the pin 656, and by the engaging surface 655 of the hook 658. These three locating features cooperate to identify a characteristic locating point 651 of the insert 650. As with insert 50, the moveable insert 650 can have a plurality of locating points 651, defined by the cooperation of one or more locating features, which can include surfaces, edges and points on the surface of the insert.

The insert 650 has a securement comprising rocker 659 having hook 658 which aligns with and engages catch 637 of the pocket when the pin 656 is fully inserted into the passage of the pocket 630. The rocker has a biasing means, such as a spring (not shown) to bias the hook end in the secured position with the catch 637. The insert 650 can be disengaged and removed from the pocket by depressing trigger 690 of the rocker 659, which pulls away and disengages the hook 658 from the catch 637. The insert is configured to be separated from the pocket by hand without the use of a mechanic's tool.

The inset 650 has a workpiece support feature upon a surface thereof. The workpiece support feature comprises a plurality of workpiece support members defined by the planar surface 671 and 672. These support surfaces support corresponding surfaces on the workpiece 98 as shown in FIG. 6. The workpiece support members 671 and 672 are machined to match the confronting supported surface of the workpiece 98.

Figure 8:
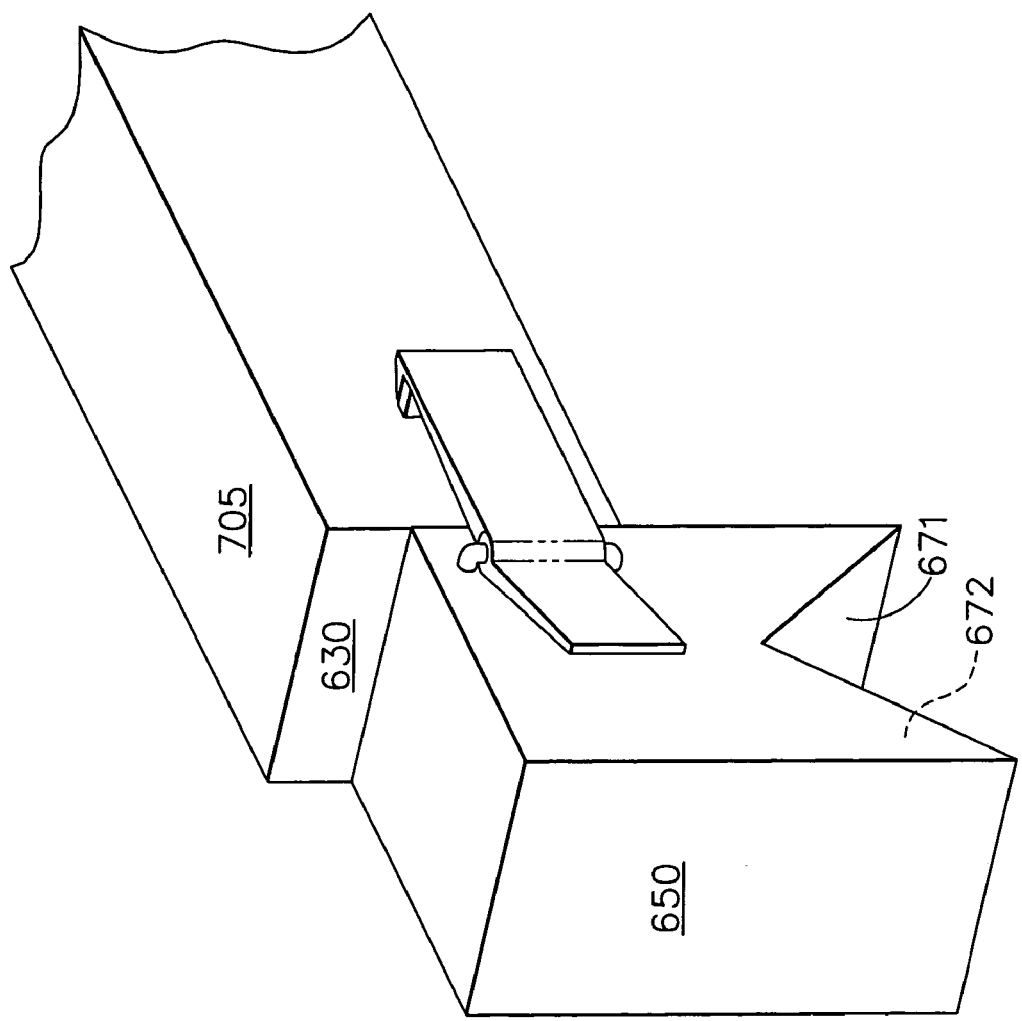
FIG. 8 shows a schematic representation of the movable tooling insert of FIG. 7 inserted into the associated pocket of the movable member, also shown in FIG. 7.

With the pin 656 inserted into the pocket 630, as shown in FIG. 8, the locating feature of the insert and the corresponding locating feature of the pocket cooperate to define a location of the workpiece support feature relative to the base 20 when the moveable insert 650 is positioned against the workpiece 98. When the hook 658 on biased rocker 659 engages catch 637 on the side of the pocket, engaging surface 635 of the pin 656 confronts engaging surface 655 of the hook 658. The locating points 631 and 651 of the pocket and of the insert become co-located. When the moveable insert 650 is in supporting position against the workpiece 98, the workpiece support feature, defined by surfaces 671 and 672, assumes a characteristic location relative to the reference point of the base 20.

The insert 650 can optionally have a pocket orientation feature. A pocket orientation feature shown in FIG. 7 comprises a detent along the side of the pin 656 which provides a characteristic shape that cooperates with the shape of the opening 636 of the pocket 630. The insert 650 can associate with pocket 630 in only one orientation. In this embodiment, the characteristic shape is an "L" shape, though other shapes, and other means for orienting the insert into the pocket in only one way are contemplated.

The installed and secured workpiece is ready for machining. The workpiece support feature of insert 50 positions the workpiece 98 into the proper location and orientation for the metalworking operation (the bore cutting and milling). The workpiece is secured into the proper location and orientation with securing force A and securing force B.

FIG. 6 shows the completed workpiece 98 after the metalworking operation that included drilling a bore 606 into the opposed face 605 and milling a second flat surface 607. The bore 606 is drilled with a defined diameter and depth into a defined position on the end face 605. The flat surface 607 is machined along a plane parallel to a plane passing through edges 615 and 616, and set off from the centerline 610 a defined distance toward edge 613, and is milled to a defined depth from face 605 toward the first end of the body.

After machining the workpiece 98, the machined piece is released from the inserts and supports (such as any force means related to force A and B, including any moveable inserts), and removed from the apparatus. The machined workpiece can be removed by hand, but is typically removed by an automated means known in the art, such as a pneumatic ejector. For automated ejection of the workpiece, it is typical to configure the insert and workpiece support features for loading of the workpiece from a side of the apparatus, so that the machine workpiece can be ejected out and away from the apparatus. After ejection of a machined workpiece, a successive identical workpiece 98 can be loaded into the device and secured for machining, whereby the workpiece support feature of the fixed insert remains semi-permanently fixed in position in between the metalworking operations upon the successive workpieces 98. The successive workpiece 98 is in the proper position and orientation for machining of the bore 605 and flat surface 607.

An embodiment of a modular tooling apparatus used in the present invention can also provide a base having a fixed workpiece support member affixed permanently to the base. A workpiece can require support both from the insert, and at another surface. A fixed workpiece support member can be configured to cooperate with the workpiece support feature of the insert 50 to position and orientate such workpiece. The fixed workpiece support member would not be removable.

In a typical method of performing a metalworking operation on a workpiece, a common base is provided and positioned onto the table. The base has at least one attachment surface that is typical configured as a pocket as described herein above. A first insert is associated and secured to the attachment surface. The insert is typically configured to associate with the attachment surface as described herein above to define a location of its workpiece support feature relative to the common base. After aligning the common base with the metalworking machine, the common base is secured to the table by a semi-permanent securement that allows the base to be unsecured, re-aligned, re-secured, and removed from the table. A provided first workpiece is positioned and secured onto the workpiece support feature of the insert, as described herein above, wherein the workpiece assumes a characteristic position and orientation relative to the metalworking machine. The characteristic position of the workpiece is such that the machining of the workpiece is completed acceptably. The machining of the workpiece removes or modifies the material of the workpiece so that the machined workpiece has the properties and configuration intended from the metalworking operation. After machining of the workpiece any restraining forces or securements are removed, to release the workpiece for removal from the workpiece support feature of the first insert.

A metalworking operation using a modular tooling apparatus that has a single insert can be performed on a successive workpiece member of a family of workpieces that are related in configuration but different in detail. A family of inserts can be configured whereby each insert member is configured to associate semi-permanently with a common attachment surface (here, a pocket). The successive members of the family of inserts have workpiece support features that are configured to position and orient their respective workpiece members in a location and orientation that permits machining of the workpiece without changing the tooling base, or making any adjustment in the position or orientation of the base 20 upon the metalworking machine. An entire family of workpieces can be machined on a modular tooling apparatus using a common base and a corresponding family of inserts.

After the last of machined first workpieces has been removed from the workpiece support feature, the first insert is removed from the base. A provided second insert, comprising a second member of the family of inserts, is associated and secured to the attachment surface of the base, wherein its locating feature is configured to associate with the locating feature of the attachment surface to define a location of the workpiece support feature of the second insert relative to the base. A second member of the family of workpieces is then positioned onto and secured to the workpiece support feature of the second insert. The second workpiece assumes a characteristic position and orientation relative to the metalworking machine for machining of the workpiece. After machining the second workpiece, the machined workpiece is removed from the workpiece support feature of the second insert.

The replacement of the first insert with the second inserts enables machining a second workpiece after the machining of a first workpiece without requiring a intermediate step of aligning the common base with the metalworking machine. Each member of the second set of inserts is configured, relative to corresponding member of the first set of inserts, to adjust for dimensional differences between the corresponding first and second workpiece members. The configuration differences between the corresponding inserts of the first and second sets enable the modular tooling apparatus to position the respective workpiece in the proper location and orientation for machining by the metalworking machine.

Figure 9:
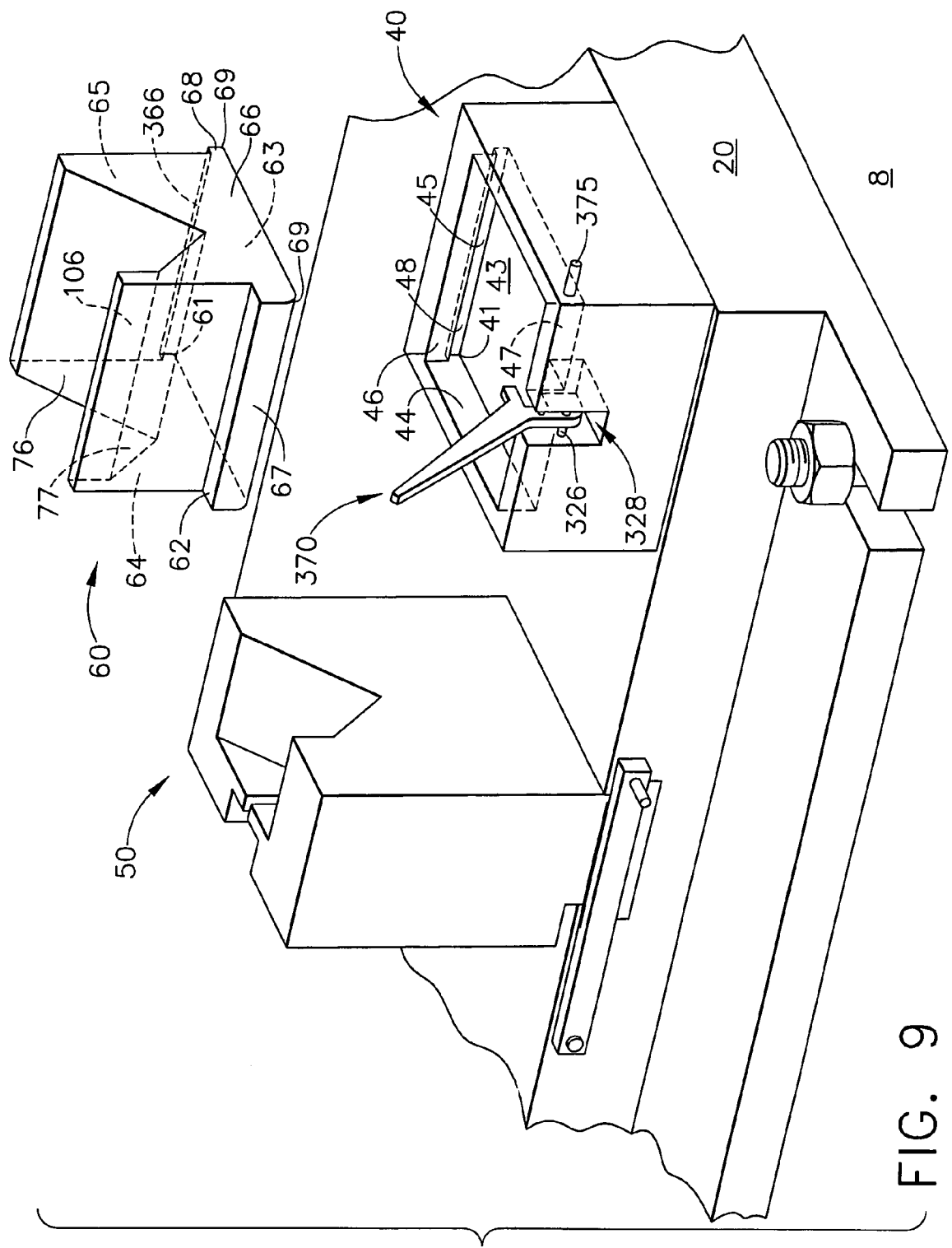
FIG. 9 shows a schematic representation of another modular tooling apparatus for machining a first workpiece, illustrating a first tooling insert associated with its pocket, and a second tooling insert for associating with a second pocket, and an extraction/locking device incorporated with the second pocket.

Another embodiment of a modular tooling apparatus used in the present invention is shown in FIGS. 9 through 12. FIG. 9 shows a base 20 having a first attachment surface comprising pocket 30, a second attachment surface comprising pocket 40, a first insert 50 associated with pocket 30, and a second insert 60 separated from its pocket 40. The base uses the two inserts 50 and 60 provide support and positioning for machining of a workpiece 198. The two inserts each have respective workpiece support features which cooperate to provide a location of the workpiece support features relative to the base. The respective workpiece support features also collectively and cooperatively support the workpiece 198, and define a position of the workpiece 198 relative to the base, and relative to the metalworking machine.

Pocket 30 and insert 50 are as described hereinabove.

The pocket 40 is defined by front wall 47, back wall 45, sidewalls 44, and floor 43. The sidewalls 44 are typically parallel to each other, as are the front wall 47 and the back wall 45. Each of these walls is typically perpendicular to the floor 43. The back wall 45 is provided with an overhanging lip 46, with a clearance recess 48 there below.

The insert 60 is provided with features that correspond to the features of the pocket 40. The lower portion 66 of the insert 60 is defined by a front surface 67, a back surface 65, side surfaces 64, and a bottom surface 63. These features are particularly configured and oriented to associate with corresponding features of the pocket 40. Correspondence between features of the pocket 40 and insert 60 is indicated by a common third digit of the respective identification numbers; for example, the back wall 45 of the pocket corresponds to the back surface 65 of the insert. In addition, the lower portion is provided with a top surface 62, a toe 68 having an upper restraining surface 66 thereon, and relief curvatures 69.

The functionality of the insert and pocket arrangement is that the insert slide into the pocket and establish a precise spatial relationship therewith. Thus, the relationship between corresponding features when the insert is seated in the pocket is confronting. However, during removal/insertion of the insert relative to the pocket, the relationship between corresponding features is sliding. The sliding relationship is particularly apparent with respect to front wall 47 and front surface 67, to sidewalls 44 and side surfaces 64, and to underside of overhanging lip 46 and the upper restraining surface 66. There is some sliding between the floor 43 and the bottom surface 63 as the toe 68 is engaged with the clearance recess 48.

Some means of restraining the insert against movement in the +z direction (upward) is deemed appropriate, particularly at the front side of the insert. To accomplish this restraining action, an extraction/locking device 370 is provided. The extraction/locking device 370 is pivotably disposed in a slot 328 in the base 20. The width of the slot is exaggerated in FIGS. 9 and 10 to better illustrate the functionality of the extraction/locking device. A pivot pin 326 is disposed in coaxial holes (not shown) in the base, and pivot hole 379 in the extraction/locking device 370 (shown in FIG. 11). When the extraction/locking device is rotated forward to its first, or locked, position, a retaining arm 371 slides over the top surface 62 of the insert 60. This position is illustrated by the dashed lines in FIG. 11. A handle 372 of the extraction/locking device provides for convenient manipulation thereof by a technician installing the insert 60 in the pocket 40, without the need for a mechanic's tool, such as a wrench or screwdriver. The extraction/locking device provides for ease of removal of an insert when the upper portion does not provide convenient surfaces for a technician to grab manually. The combined action of the retaining arm 371 and the overhanging lip 46 fully restrains the insert 60 against movement in the +z direction.

A detent means, to retain the extraction/locking device in its first position, is provided. In a typical embodiment of the detent means, a retaining pin 375 is slidably disposed in a hole through a front aspect of the base 20, and biased against the extraction/locking device, such that it snaps into a locating hole 376 in the extraction/locking device when the extraction/locking device is moved to its first position. The detent means urges the extraction/locking device to remain in its first position. A knob or knurled surface on the exposed end of the retaining pin facilitates convenient disengagement thereof from the hole in the extraction/locking device.

Figure 11:
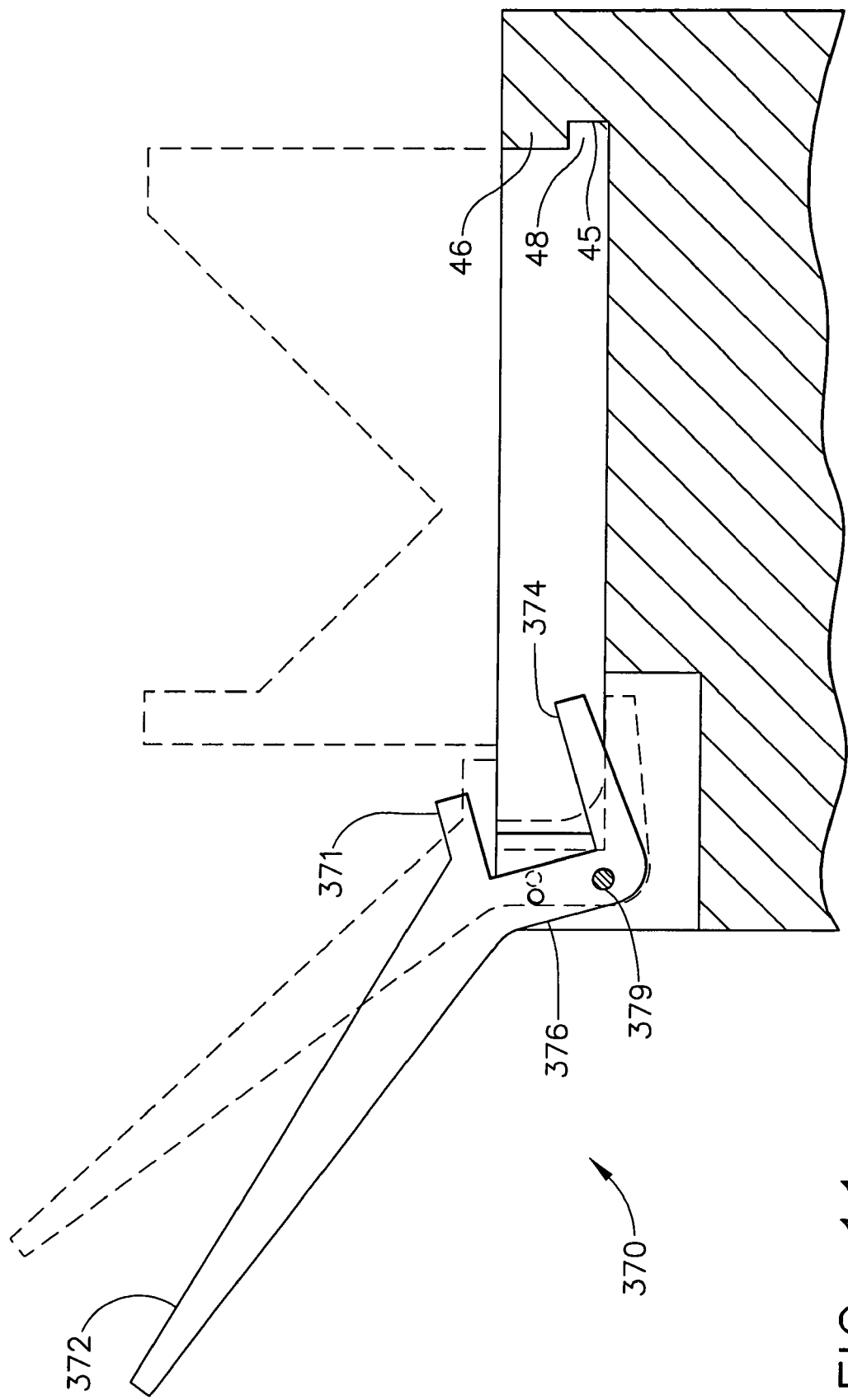
FIG. 11 shows a cross sectional view through the modular tooling apparatus shown in FIG. 10. In this Figure, the second insert is shown in dashed lines.

The extraction/locking device provides an additional function, namely, to facilitate extraction of the insert 60 from the pocket 40. Typically, an extraction/locking device can be used when an insert 60 does not have a convenient handle for a technician to grasp to extract the insert from its pocket. The extraction/locking device typically comprises an extraction feature that is configured to press against a surface of the lower portion 66 of the insert 60, as the extraction/locking device is pivoted to its second position. As the extraction/locking device 370 is rotated toward its second, or extraction, position, a toe 374 exerts an upward force on the bottom 63 of the insert 60, thereby exposing the front and back surfaces of the insert sufficiently for a technician to grab the insert. The second position of the extraction/locking device is shown in FIG. 11 by solid lines.

Pocket 40 has a corresponding locating feature that comprises a plurality of locating members defined by the floor 43, the rear sidewall 44, and the backwall 45. These three planar locating features cooperate to identify a characteristic locating point 41 of the pocket 40.

The corresponding insert 60 has a locating feature, which comprises a plurality of locating members defined by the bottom 63, rear sidewall 64, and backwall 65. Theses three planar locating features cooperate to identify a characteristic locating point 61 of the insert 60.

Figure 12:
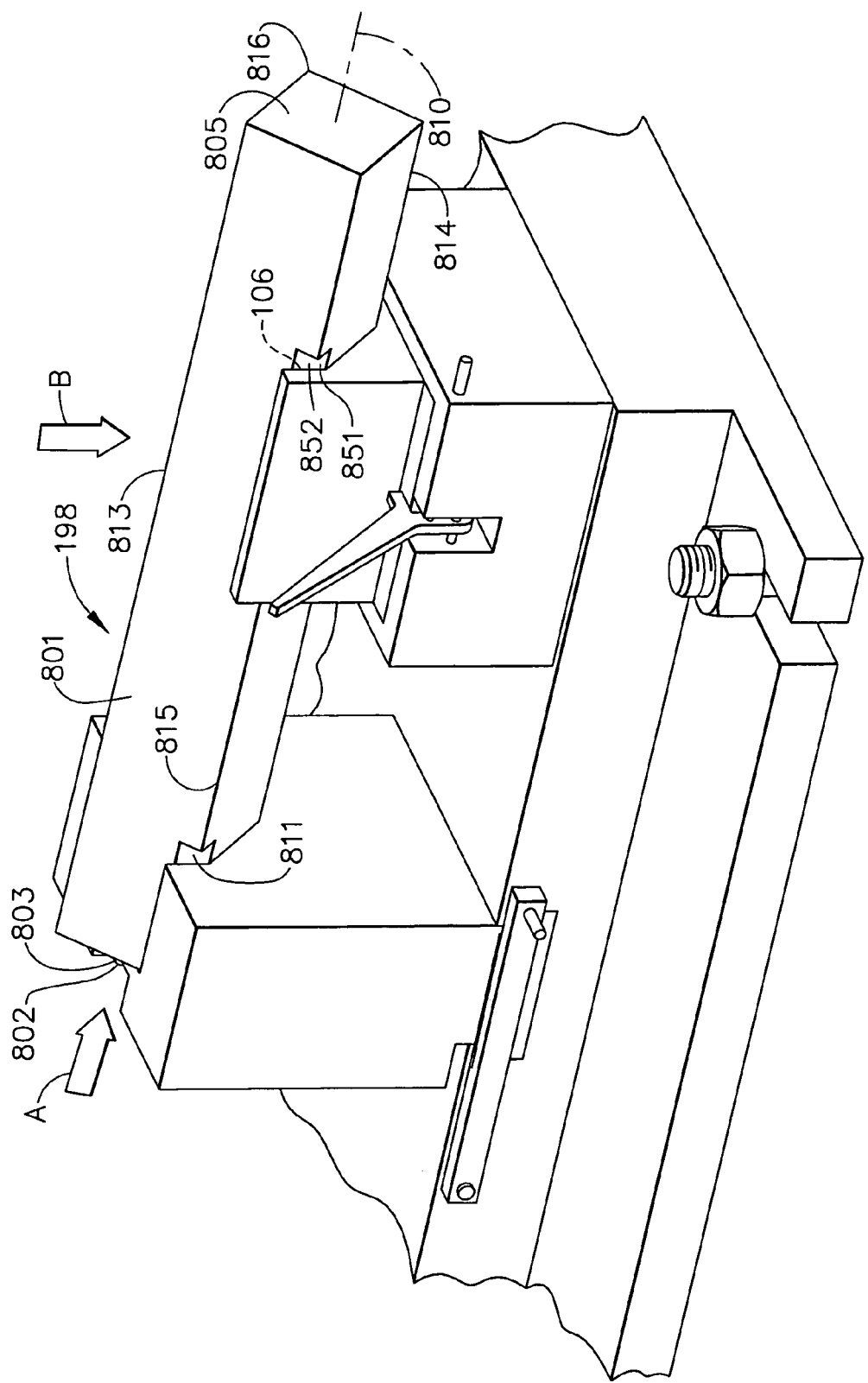
FIG. 12 shows a schematic representation of the first workpiece in the modular tooling apparatus of FIG. 10, illustrating how the first workpiece can be secured in the apparatus.

The insert 60 has a workpiece support feature upon a surface thereof. When insert 60 is inserted into pocket 40, the locating points 41 of the pocket and 61 of the insert become co-located. Co-locating the locating points thereby defines the characteristic location of the workpiece support feature of the insert relative to the reference point of the base 20. The workpiece support feature comprises a plurality of workpiece support members defined by the confronting inclined planes 76 and 77. These support surfaces support corresponding surfaces on the workpiece as shown in FIG. 12. The workpiece support members 76 and 77 are precisely machined to provide characteristic positioning (in the x, y and z coordinate space) of the workpiece support feature relative to the insert locating point 61.

The insert 60 also comprises a pocket orientation feature, to associate the insert with the pocket 40 in only one orientation. The pocket orientation feature comprises toe 68 of the insert and its association with clearance recess 48 of the pocket. If the insert is turned 180° about its z axis (not shown), it can not be inserted into the pocket. This feature prevents a user of the apparatus from inserting the insert 60 improperly.

The insert 60 also comprises a workpiece orientation feature so that a workpiece 198 can have only one orientation when associated with the workpiece support feature of the properly-inserted insert 60. The workpiece orientation feature comprises a shoulder 106 that extends upwardly from the support surface comprising workpiece support member 77. The shoulder 106 is configured to register with the flat 811 of the workpiece 198 (shown in FIG. 12) that has been machined only along edge 815 of the workpiece body. The shoulder 106 prevents placement of the workpiece upon the support members 76 and 77 if the workpiece is placed into the apparatus in any of the other three orientations where body edges 813, 814 or 816 confront the shoulder 106.

FIG. 12 shows the modular tooling apparatus having a workpiece 198 positioned upon the workpiece support features of the inserts 50 and 60. The workpiece 198 is shown prior to the metalworking operations to be performed using the modular tooling apparatus. The workpiece comprises a rectilinear body 801 having a square cross section, and a ball joint 802 affixed to a first end of the body. The ball joint 802 comprises a spherical head 803 adjoined to the body 801 by a cylindrical neck 804. The head 803 and neck 804 are aligned with the centerline 810 of the workpiece. The workpiece also has a flat 851 in the middle of the body 801 having a face 852 machined in a prior metalworking operation along the length of edge 815 of the body 801. The face 852 is a planar surface that lies parallel to a plane passing through workpiece edges 813 and 814. The location of the cooperating workpiece support features of insert 50 (workpiece support members 71, 72, and 73) and of insert 60 (workpiece support members 76 and 77) define a location of the workpiece 198 in reference to the base 20. The location of the workpiece provides a characteristic position of a reference point of the workpiece in x, y and z space, and a characteristic orientation of the workpiece (its pitch, roll, and yaw) about its x, y and z axes.

Workpiece 198 (prior to metalworking) has several features identical configuration and dimensions to the workpiece 98 of FIG. 3, including the ball joint 803, flat 811, and the cross-sectional size of the body 801. Insert 50 of FIG. 3 illustrates that an insert of the present invention can provide workpiece support for two dissimilar workpieces (workpiece 98 in FIG. 3, and workpiece 198 in FIG. 12) that have one or more identical features having identical workpiece support requirements.

In another typical method of performing a metalworking operation on a workpiece, the base uses at least two inserts associated with corresponding first and second attachment surfaces. The first insert is a first member of a first family of inserts, and associates with the first attachment surface. The second insert is a first member of a second family of inserts, and associates with the second attachment surface. A provided first workpiece is positioned and secured onto the workpiece support features of the two inserts, as described herein above, wherein the workpiece assumes a characteristic position and orientation relative to the metalworking machine. The characteristic position of the workpiece is such that the machining of the workpiece is completed acceptably. The machining of the workpiece removes or modifies the material of the workpiece so that the machined workpiece has the properties and configuration intended from the metalworking operation. After machining of the workpiece, any restraining forces are removed to release the workpiece for removal from the workpiece support features of the first and second inserts.

The metalworking operation also optionally includes a step of evaluating the machined workpiece, to ensure the machining operation has been performed acceptably. An evaluation can be by a visual or mechanical inspection, by means well known in the art. If a machined workpiece has been acceptably machined, then the modular tooling apparatus is properly aligned with the metalworking machine for performing metalworking operations on subsequent workpieces. If the machined workpiece has not been acceptably machined, then the base of the modular tooling apparatus can be re-aligned with the metalworking machine before machining a subsequent workpiece.

Figure 13:
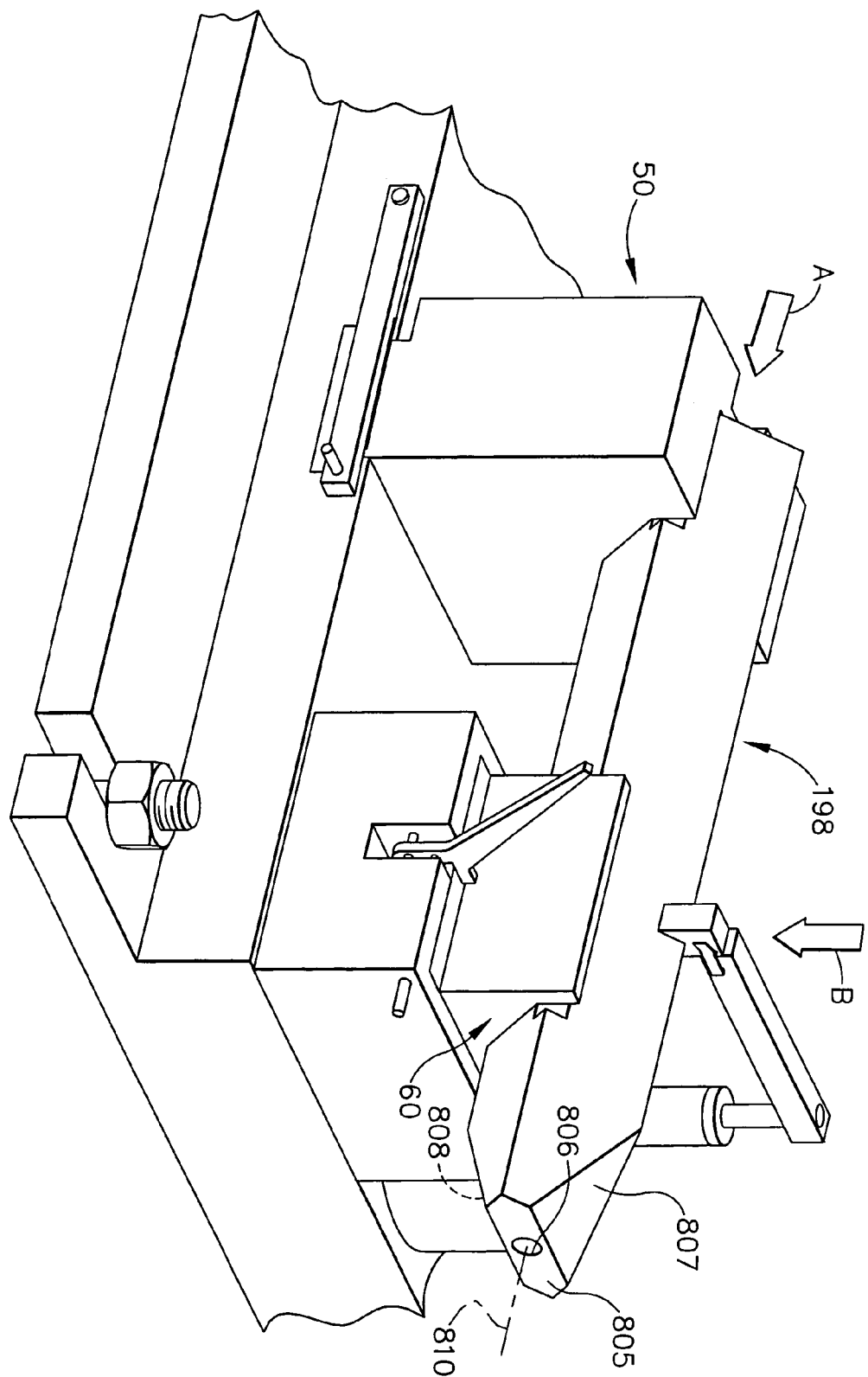
FIG. 13 shows a schematic representation of the first workpiece in the modular tooling apparatus of FIG. 12, after completion of the metalworking operation.

FIG. 13 shows the completed workpiece 198 after the metalworking operation that includes drilling a bore 806 into the opposed face 805, and the bevel cutting of opposed faces 807 and 808. The bore 806 is drilled with a defined diameter and depth along the centerline 810. The beveled face 807 is a plane oriented at 45° from the centerline, that passes through the face 805 at the periphery of the bore 806 (a distance of the radius of the bore from the centerline toward body edge 813), and oriented from the centerline toward body edge 813. The beveled face 808 is a plane oriented at 45° from the centerline, that passes through the face 805 at the periphery of the bore 806 (a distance of the radius of the bore from the centerline toward body edge 814), and oriented from the centerline toward body edge 814.

Figure 14:
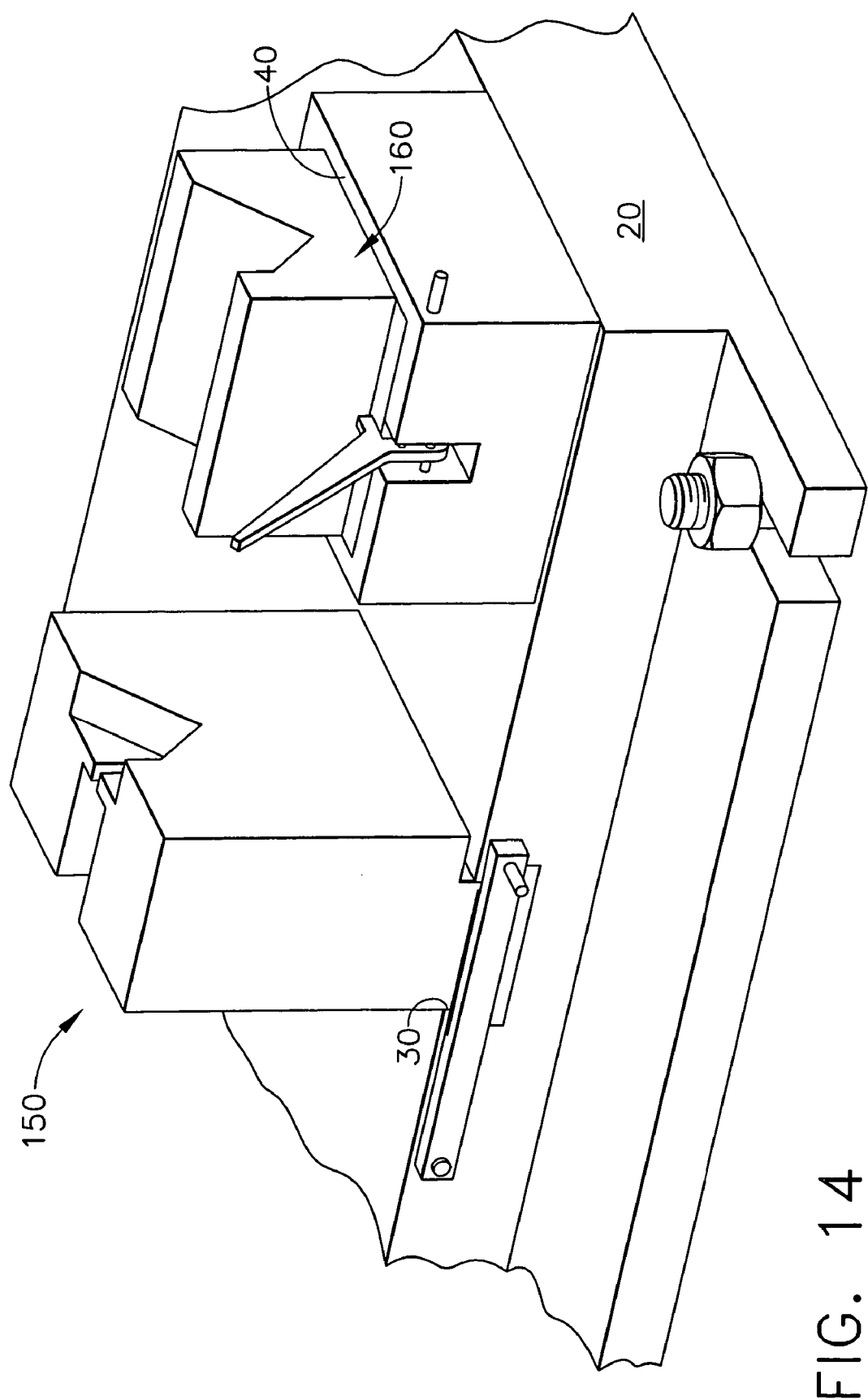
FIG. 14 shows a schematic representation yet another modular tooling apparatus for machining a second workpiece, having a second set of first and second inserts installed in the base.
Figure 15:
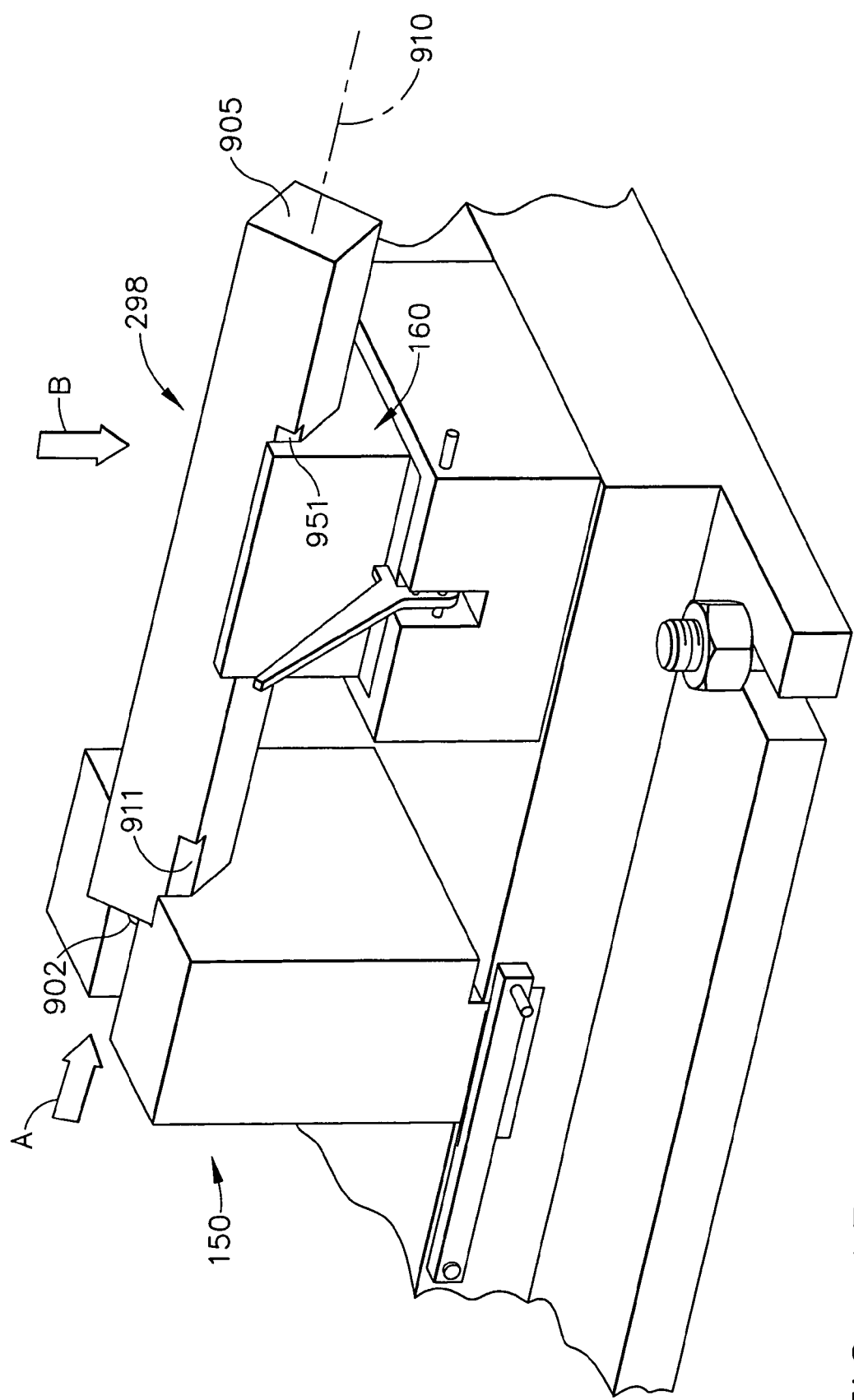
FIG. 15 shows a schematic representation of the second workpiece in the modular tooling apparatus of FIG. 14, illustrating how the second workpiece can be secured in the apparatus.
Figure 16:
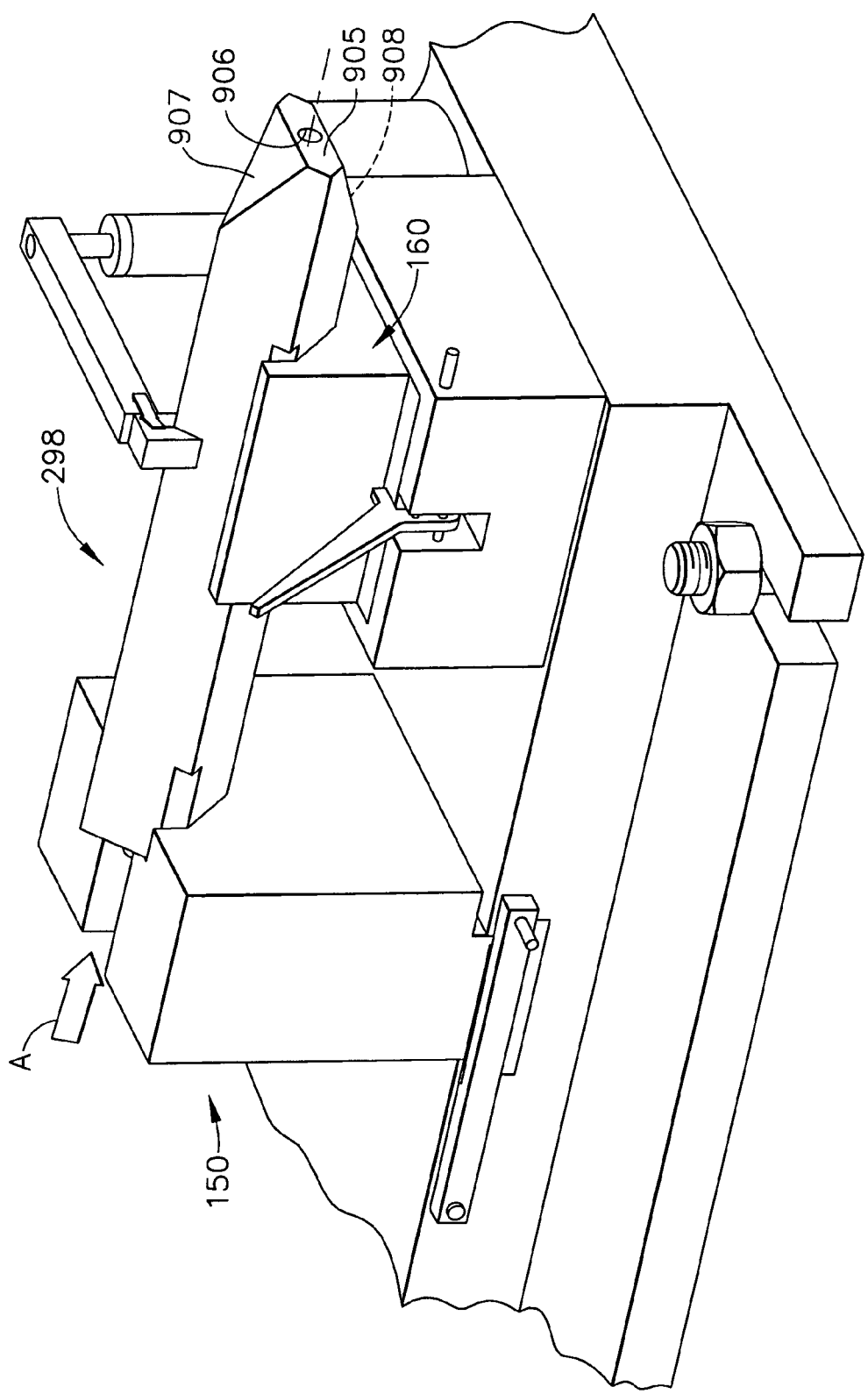
FIG. 16 shows a schematic representation of the second workpiece in the modular tooling apparatus of FIG. 14, after completion of the metalworking operation.

Another embodiment of a modular tooling apparatus used in the present invention is shown in FIG. 14, showing a modular tooling apparatus having a base 20 with pockets 30 and 40, and a second set of inserts 150 and 160, respectively, associated therewith. The base 20 with the pockets 30 and 40 are the same base and pockets discussed above for FIGS. 9 and 10. Inserts 150 and 160 are configured to have lower portions having the same configuration as the lower portions 56, 66, respectively, to associate with pockets 30 and 40. The workpiece support feature of the upper portion of insert 150 is related in configuration but different in detail from the workpiece support feature of insert 50. Similarly, the workpiece support feature of the upper portion of insert 160 is related in configuration but different in detail from the workpiece support feature of insert 60. The workpiece support features of inserts 150, 160 cooperate to support a workpiece 298, as shown in FIG. 15, which is related in configuration but different in detail from the workpiece 198. Workpieces 198 and 298 can be compared by reference to FIG. 12 and FIG. 15. The workpieces have the same overall body configuration, and several identical features including the ball joints, the first end flats 811 and 911, and the mid-body flats 851 and 951. However, the workpieces are different in some detail. The body length and cross-sectional size of workpiece 198 are greater than those of workpiece 298.

After the last of machined first workpieces has been removed from the workpiece support feature, the first insert and second insert are removed from the base. A provided third insert, comprising a second member of the first family of inserts, is associated and secured to the first attachment surface of the base, wherein its locating feature is configured to associate with the locating feature of the first attachment surface to define a location of the workpiece support feature of the third insert relative to the base. A provided fourth insert, comprising a second member of the second family of inserts, is associated and secured to the second attachment surface of the base, wherein its locating feature is configured to associate with the locating feature of the second attachment surface to define a location of the workpiece support feature of the fourth insert relative to the base. A second member of the family of workpieces is then positioned onto and secured to the workpiece support features of the third and fourth inserts. The second workpiece assumes a characteristic position and orientation relative to the metalworking machine for machining of the workpiece. After machining the second workpiece, the machined workpiece is removed from the workpiece support features of the third and fourth inserts.

The replacement of the first set of inserts (the first members of the first and second families of inserts) with the second set of inserts (the second members of the first and second families of inserts) enables machining a second workpiece after the machining of a first workpiece without requiring a intermediate step of aligning the common base with the metalworking machine.

Figure 10:
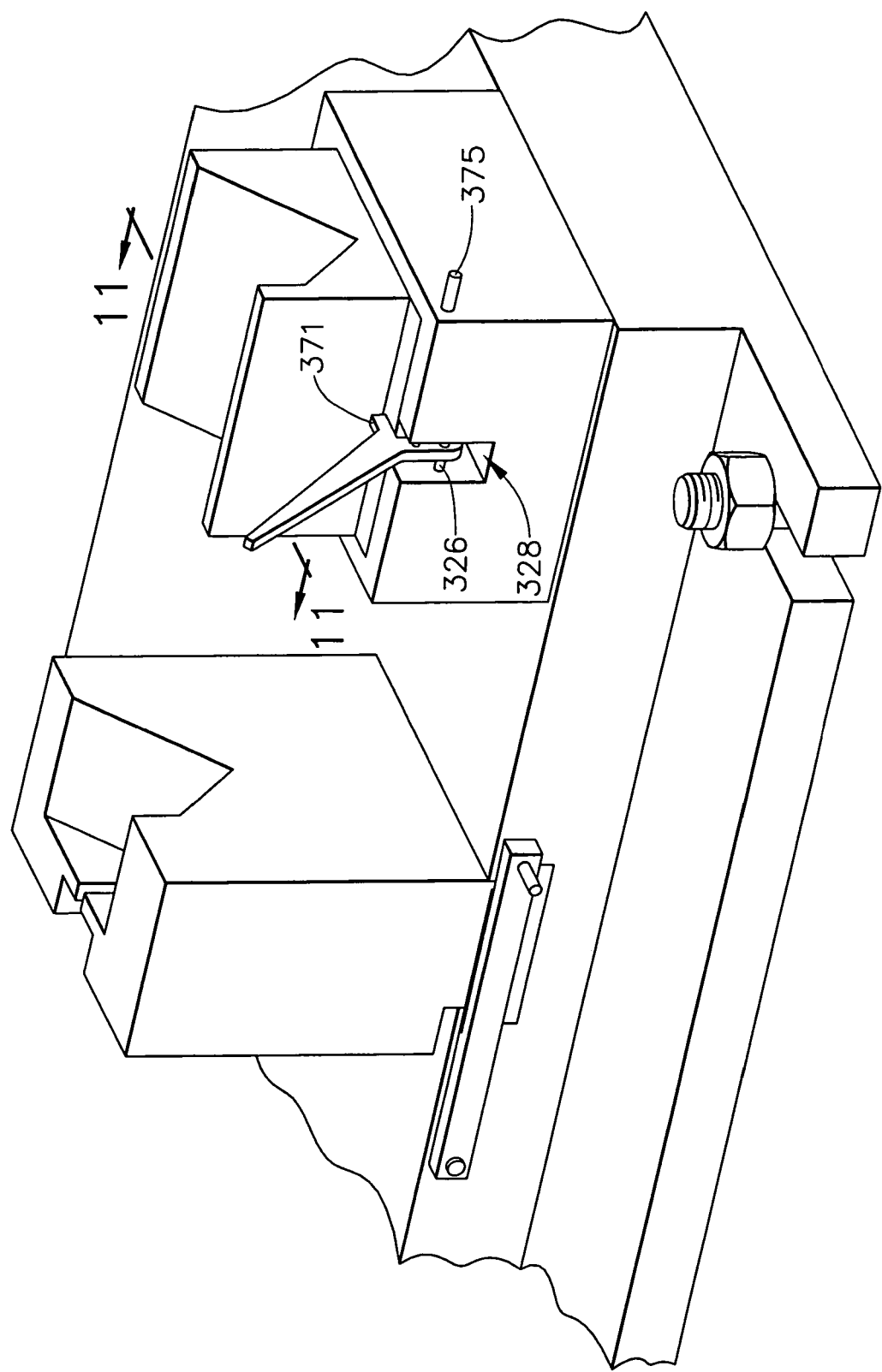
FIG. 10 shows a schematic representation of the modular tooling apparatus in FIG. 9, with the second tooling insert installed in the base. In this Figure, the extraction/locking device is shown in its locking position.

In a metalworking operation, when the production requires a change from machining workpiece 198 to workpiece 298, the technician removes inserts 50 and 60 shown in FIG. 10, and installs inserts 150 and 160. Workpiece 298 is then inserted into the workpiece supports of the inserts 150, 160. By comparing FIGS. 12 and 15, the position of the faces 805 of workpiece 198 and 905 of workpiece 298 are in the same location and orientation. Both face 805 and 905 have their centers in the exact same location relative to the base. Consequently, the metalworking machining of the bore and bevels in workpiece 298 can be made without any adjustment in the position or orientation of the metalworking machine used to machine workpiece 198.

The similarity in configuration of the workpiece support features of second insert set 150 and 160 with those of first insert set 50 and 60 enable a rapid change from a first workpiece 198 to a second workpiece 298, which is related in configuration but correspondingly different in detail. The successive metalworking operations on the first workpiece 198 and second workpiece 298 do not require re-alignment of the base 20. The use of the modular tooling apparatus of the invention with a family of insert sets inserts 50 and 60, 150 and 160, provides for machining of a family of workpieces 198, 298 without changing the base tooling, thereby avoiding steps normally required to exchange base tooling, including alignment of the base with the metalworking machine. When identical metalworking operations are required on both workpiece 198 and 298, the configuration of workpiece support features of the second set of inserts 150, 160 can be configured to position the workpiece 298 into a position for metalworking that does not require any changing in positioning of both the base and the metalworking machine. As shown in FIGS. 12 and 15, successive workpieces 198 and 298, which are related in configuration but different in detail, can be machined with identical workpiece operations (the bore and the beveled faces).

Figure 17:
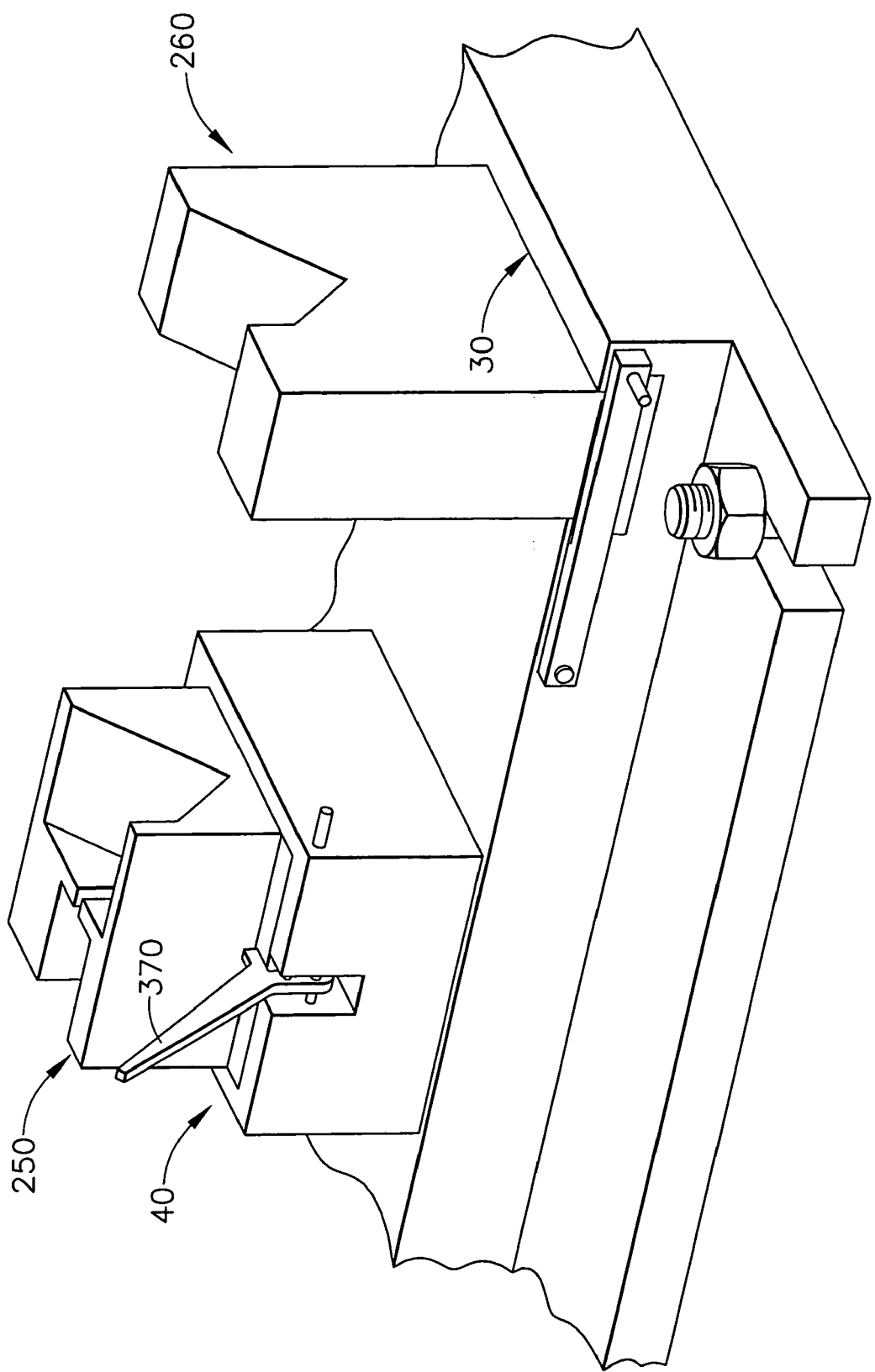
FIG. 17 shows a schematic representation of another modular tooling apparatus, having a different combination of inserts and securements.

In yet another embodiment of a modular tooling apparatus used in the present invention, the modular tooling apparatus has a base and inserts 250 and 260 shown in FIG. 17. In this embodiment, the workpiece support features configured on the upper portions of the inserts 250 and 260 are essentially the same as those shown for inserts 50 and 60, respectively, in FIG. 10. Inserts 250 and 260 can support the same workpiece 198 as do inserts 50 and 60. However, the lower portions of inserts 250 and 260, as well as the pockets and the securements for the inserts in the pockets, have been exchanged from those used with inserts 150 and 160 in FIG. 10. The configuration of the insert and the selection of a securement for the insert can be indicated by the type of machining required (e.g., drilling, milling, etc.) and the position of the machining on the workpiece. In FIG. 17, insert 260 is configured to resist movement, and to become more secure in its pocket, by forces exerted on the insert either in the −z (downward) direction, or in the forward and backward directions (along the y axis). Insert 250 is configured to resist movement by forces exerted on the insert either in the −z (downward) direction, or from the side directions (along the x axis).

Figure 18:
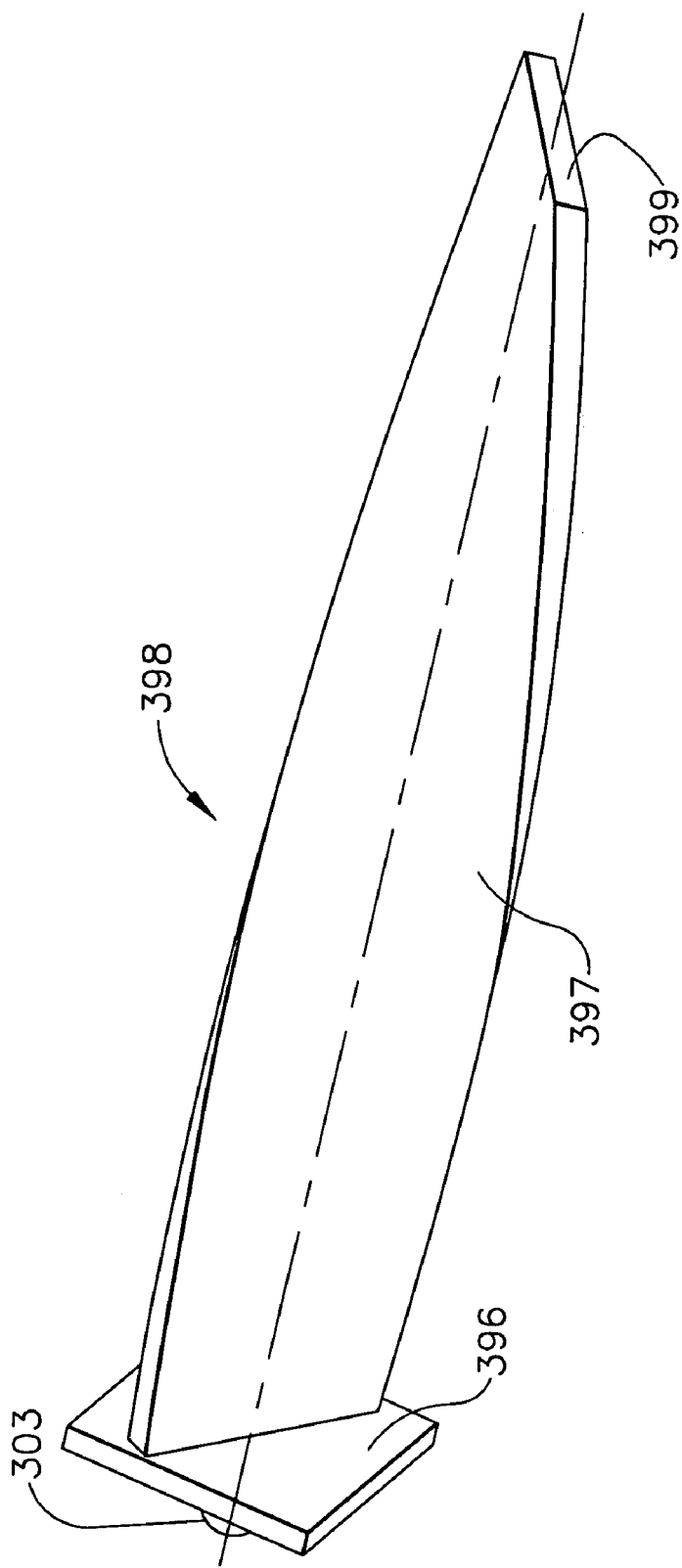
FIG. 18 shows a schematic representation of a workpiece that can be machined on a modular tooling apparatus of the invention.

In yet another embodiment of a modular tooling apparatus used in the present invention, a workpiece 398 shown in FIG. 18 has a characteristic configuration. The workpiece is typical of a compressor blade for a gas turbine engine. In a typical metalworking operation on the compressor blade, the end 399 of the blade is trimmed to precise dimensions relative to its dovetail, illustrated in the Figure as a ball joint 303. The relatively thin cross section of the airfoil along its length leaves it prone to movement and vibration in a typical milling operation that trims the end of the blade.

Figure 19:
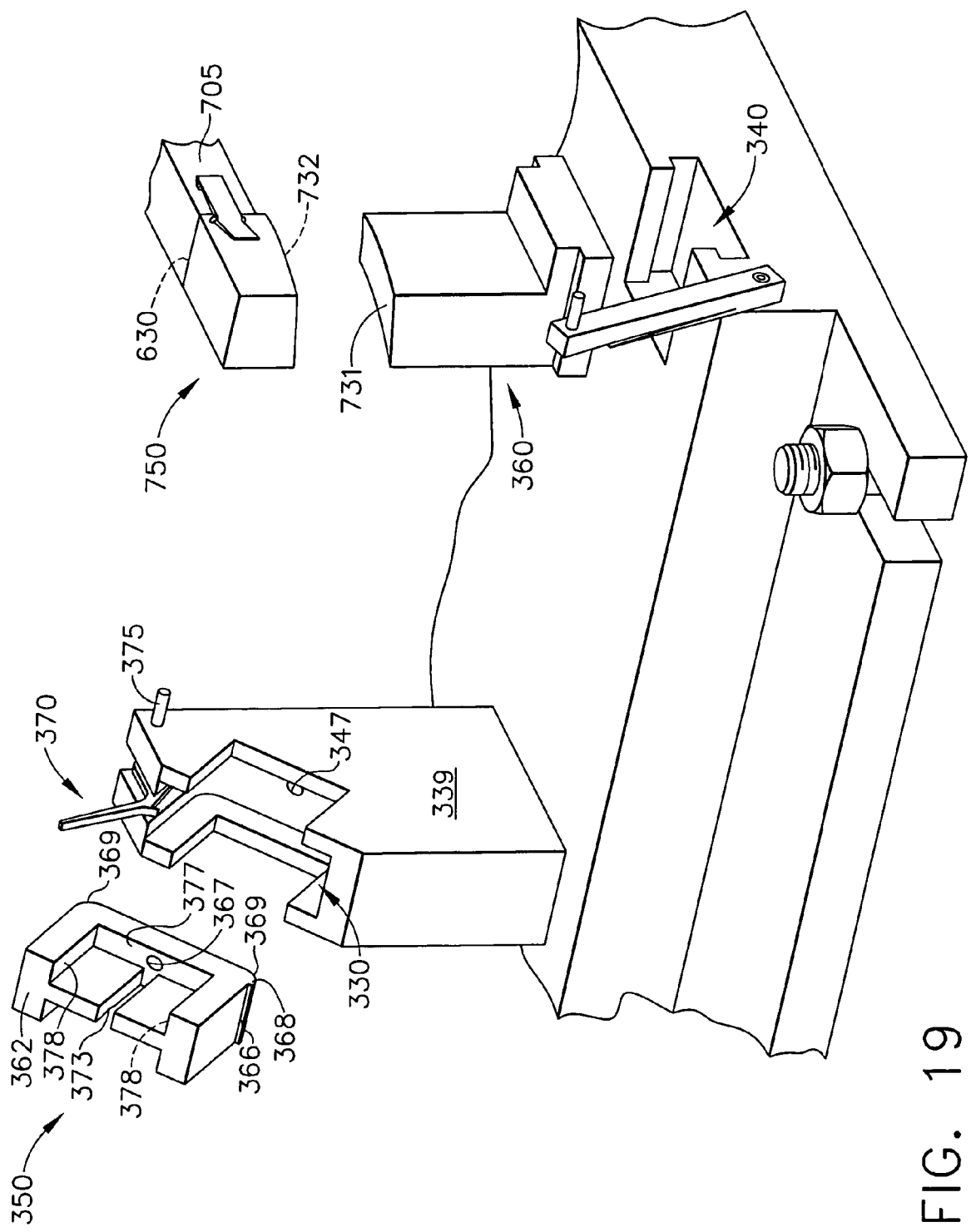
FIG. 19 shows a schematic representation of a modular tooling apparatus having a plurality of inserts that associate with corresponding pockets in the base, to support the workpiece shown in FIG. 18.
Figure 20:
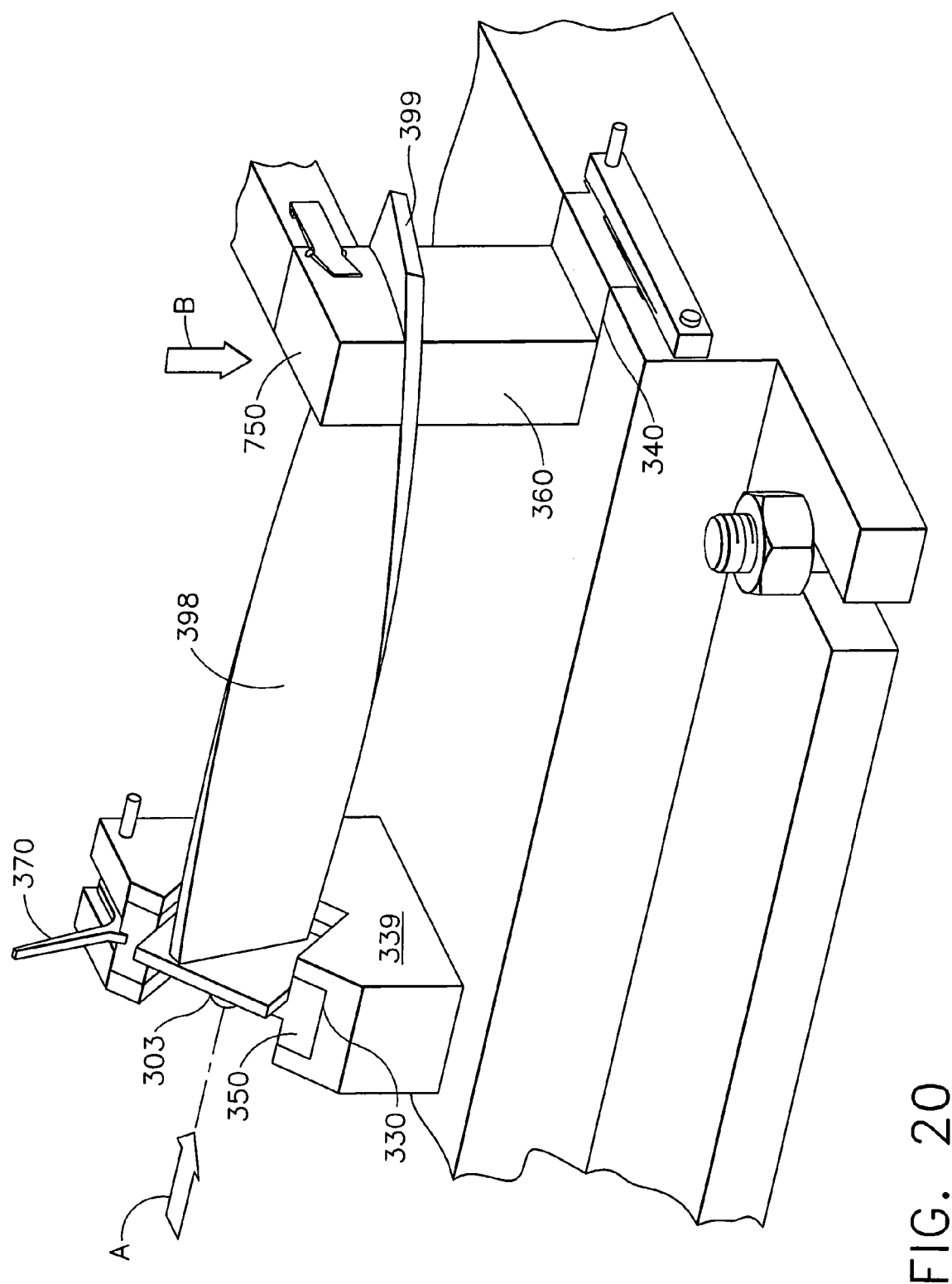
FIG. 20 shows a schematic representation of the workpiece of FIG. 18 positioned on the modular tooling apparatus shown in FIG. 19, having inserts configured to support the characteristic features of the workpiece.

FIG. 19 shows a modular tooling apparatus for milling the end of the compressor blade 398. The apparatus comprises a base having a first pocket 330 on the surface 339 of the base, and a second pocket 340. The apparatus also has a first insert 350, shown separated from its associated pocket 330, and a second insert 360, shown separated from its associated pocket 340. The apparatus also has a third insert 750, which is shown inserted into its pocket 630. The first insert 350 is used to position and secure the dovetail 303 of the blade. The second insert 360 supports the underside of the airfoil 397 at a position near the end of the blade. The third insert 750 supports the upper side of the airfoil 397, opposing the second insert 360. A toggle clamp provides a force A, shown in FIG. 20, along the y axis of the workpiece against the ball joint in the +y direction. A hydraulic cylinder (not shown) has an arm 705 comprising pocket 630, into which insert 750 has been secured, similar to the arm 705 and pocket 630 shown in FIG. 8. The cylinder provides a downward force B onto the moveable third insert 750 after positioning over the airfoil, to firmly secure the airfoil section from movement by pressing it against second insert 360, as shown in FIG. 20. The combination and cooperation of the inserts 350, 360 and 750 provide precise positioning and securement of the workpiece during the end trim milling operation.

Insert 350 has a lower portion having a configuration similar to insert 60 shown on the right side of FIG. 9. The insert 350 includes a lower portion having a toe 368 having an upper restraining surface 366, a top surface 362, and relief curvatures 369. The insert has an upper portion having a plurality of workpiece support features comprising dovetail restraints 373, and support members 377 and 378. The dovetail restraints are configured to cooperate with force A (shown in FIG. 20) to secure and prevent the dovetail 303 from movement in any direction. The support members 377 and 378 are configured to position the blade base 396 there between.

Pocket 330 is configured to associate with and secure insert 350 to the base. Pocket 330 is positioned on base surface 339 of the base, and is oriented at an angle of about 45° from the base. The insert 350 is inserted into the pocket and secured therein with an extraction/locking device 370, shown in FIG. 20 in the extracting position. The orientation of the insert provides a convenient angle for inserting and removing the workpiece.

Insertion of the workpiece onto the apparatus is typically by hand. The workpiece after machining is typically removed by an automatic ejection means known in the art. Base surface 339 can be configured with a passage 347 through which a pneumatically-actuated ejecting pin (not shown) can be thrust from within the base. After machining the workpiece, the ejecting pin is actuated to pass through an aperture 367 in the surface 377 of the insert 350. The ejecting pin contacts the blade base 396, and ejects the workpiece from the assembly.

Insert 360 has a lower portion configured similar to insert 50 shown in FIG. 1, though oriented in the y direction. Insert 360 associates with pocket 340, which is likewise configured similar to pocket 40 shown in FIG. 1. Insert 360 has a workpiece support feature comprising workpiece support surface 731 that is precisely machined to a contour that mates with the contour of the lower surface of the airfoil 397 at its place of support. Insert 750 has a workpiece support feature comprising workpiece support surface 732 that is precisely machined to a contour that mates with the contour of the upper surface of the airfoil 397 at its place of support.

The dovetail 303 of the workpiece is first positioned into insert 350, and with its airfoil supported by insert 360. Moveable insert 750 is positioned to register with the upper surface of the airfoil. Once all inserts are positioned and securing forces A and B are applied (to the dovetail and to the movable insert 750, respectively), the workpiece is secured and ready for machining.

The present invention is useful as a method for performing a metalworking operation on a family of compressor blades for a gas turbine engine. When production requires a change from machining a blade 398 to a next-sized compressor blade member of the same family, the technician removes the set of inserts 350, 360 and 750 shown in FIG. 20, and installs and secures a next-sized set of member inserts (from the family of inserts) that correspond to the next-sized compressor blade. The next-sized compressor blade is then inserted into the workpiece supports of the set of next-sized set of inserts. The next-sized set of inserts has been configured to position the next-sized compressor blade in a location and orientation that permits milling of its end without changing the tooling base, or making any adjustment in the position or orientation of the base 20 upon the metalworking machine. An entire family of compressor blades can be machined on a modular tooling apparatus using a common base and a corresponding family of sets of inserts.

As indicated above, the base of the present invention can be made from a series of distinct laminar plates, aligned and fastened together. Such laminar plates can be aligned by drilling and reaming mating holes through two or more such plates, and then pressing dowel pins through the mating holes. Alternatively, keyways can be cut into abutting surfaces of adjacent plates, and rectangular keys inserted therein. Any other means for precisely aligning one plate with respect to an adjacent plate could be employed. The laminar plates can be conveniently fastened to each other by bolting. Bolting offers the advantage that the assembled base can be disassembled to repair or replace any of the laminar plates that had been worn or damaged in service. Other means of fastening the plates together, such as by surrounding the plates by a frame, and inserting a pair of wedges between the plates and the frame would suffice.

In the context of the present invention, a laminar base offers a convenient means for constructing a pocket having precise dimensions and accurately parallel sides therein. The portion of the base 20, shown in FIG. 9, that comprises pocket 40 illustrates this aspect of the invention. In order to accurately situate an insert 60 in the pocket 40, the sidewalls 44 are typically parallel to each other and separated by a precise distance that is slightly greater than the distance between the side surfaces 64 of the insert. Similarly, the slot 328 in the base is typically slightly greater in width than the thickness of the extraction/locking device 370, shown in FIG. 11. Thus, the portion of the base 20 that includes the pocket 40 can be made from five laminar plates, oriented in a vertical position, from the lower left to upper right portions of FIG. 9. The five plates are a first plate comprising the slot 328, second and third plates comprising the two sidewalls, and fourth and fifth plates spacing the slot from the adjacent sidewall. In this example, the first plate is ground to a specified thickness, and the contour of the cavity for receiving the extraction/locking device is machined away. The fourth and fifth plates are ground to their respective thicknesses. The second and third plates are also ground to their respective thicknesses. The five plates are then clamped together while alignment and bolting holes are drilled through all five plates. The first, fourth and fifth plates are temporarily aligned clamped together while the contour of the front and back walls, 47 and 45, respectively, the bottom 43, and the overhanging lip 46 and clearance recess 48 are machined. A wire EDM machining operation can provide the requisite precision in machining the contour of these surfaces, and ensuring that each of these surfaces is perpendicular to the surfaces of the plates. Any other machining process can be employed, although achieving the requisite precision can be more difficult. The five plates would then be semi-permanently fastened to each other.

An insert can also be fabricated from a series of distinct laminar plates. For example, insert 350, shown in FIGS. 19 and 20, can be made in a manner analogous to that just described for fabricating a base. It is also contemplated that an entire tooling apparatus, whether or not that tooling incorporates the modular concepts of the present invention, can be made from a series of distinct laminar plates. Circumstances that can favor tooling fabricated with laminar plates include a need for a precisely dimensioned cavity on a surface of the tooling, a need for precisely parallel surfaces on the tooling, or a need for disassembly of the tooling for repair.

The modular tooling apparatus used in the present invention has been described and illustrated in terms of a base having a pocket, into which an insert having a cooperating lower portion is inserted. However, is contemplated in the present invention to associate the insert with the base by others means. In other embodiments of the invention, the attachment surface can comprise a raised surface on the base which can resemble the lower portion of an insert, such as lower portion 56 of insert 50 as described for and shown in FIG. 1. The raised surface of the base can be configured to associate with an insert comprising a correspondingly configured pocket, such as pocket 30 as described for and shown in FIG. 1.

The concepts of a modular tooling apparatus described herein are particularly useful in the context of an improved manufacturing cell of the present invention. An objective in employing the concepts of the improved manufacturing cell is performing each metalworking operation in turn, moving the workpiece from one metalworking machine to the next, and generally accelerating the overall manufacturing process. When the manufacturing cell is used for the production of a single type of workpiece, day in and day out, the challenge to the tooling designer is minimizing the time required to replace one workpiece with the next. The modular tooling apparatus described herein assists in accomplishing this objective. However, when the manufacturing cell is used for multiple types of workpieces, a larger challenge is presented to the tooling designer. He or she attempts to devise a way to quickly change the tooling, to accommodate the different types of workpieces. The modular tooling apparatus used in the present invention allows the tooling designer to meet this challenge by designing only a different set of inserts for use with a common base. In operation, the common base 20 is removed from the table 8 of the metalworking machine only for maintenance purposes.

Given that there is a plurality of metalworking machines in a manufacturing cell, a similar modular tooling apparatus can be provided for each such metalworking machine. Of course, the modular tooling apparatus provided for each metalworking machine will embody features that specifically address the needs of the metalworking operation or operations performed on that machine. Thus, the time and effort required to change the tooling for each metalworking machine in the improved manufacturing cell is substantially reduced through the concepts of the present invention.

In an embodiment of the invention, three metalworking machines are employed in a manufacturing cell to manufacture the workpiece shown in FIG. 13. The workpiece shown in FIG. 13 is made from the workpiece 198 shown in FIG. 12. The workpiece 198 comprises a rectilinear body 801 having a square cross section, and a ball joint 802 affixed to a first end of the body. The ball joint 802 comprises a spherical head 803 adjoined to the body 801 by a cylindrical neck (not shown, but similar to cylindrical neck 604 shown in FIG. 2). The head 803 and neck are aligned with the centerline 810 of the workpiece. The raw material for this workpiece can be square bar stock, procured in long bars. Machining the ball joint and cylindrical neck, and parting the workpiece from the bar, can be easily accomplished in a lathe, turret lathe or turning center (not shown in FIG. 21). The workpiece can be conveniently secured to the spindle of the metalworking machine through the use of a collet. While this metalworking operation is known to those skilled in the metalworking arts, it can be conveniently incorporated in a manufacturing cell to achieve the advantages characteristic of such cells.

As shown in FIG. 12, the workpiece also has a flat 811 at a first end of the body 801 having a face 812 machined in a first metalworking operation along the length of edge 815 of the body 801. The face 812 is a planar surface that lies parallel to a plane passing through workpiece edges 813 and 814. The workpiece has a second flat face 851 machined in the middle of the body along the same edge 815, also lying parallel to a plane passing through workpiece edges 813 and 814. The two flat surfaces 812 and 851 can be conveniently milled on a milling machine or machining center, shown at 1 in FIG. 21. The workpiece can be conveniently supported and secured by a modular tooling apparatus that is similar to that shown in FIGS. 12 and 13. As the workpiece is axisymmetric prior to milling the two flat surfaces 812 and 851, there is no need for providing a workpiece orientation feature 106 in either of the inserts 50 and 60. Means for securing the workpiece to the modular tooling apparatus can be provided by securement such as shown at 705.

Figure 21:
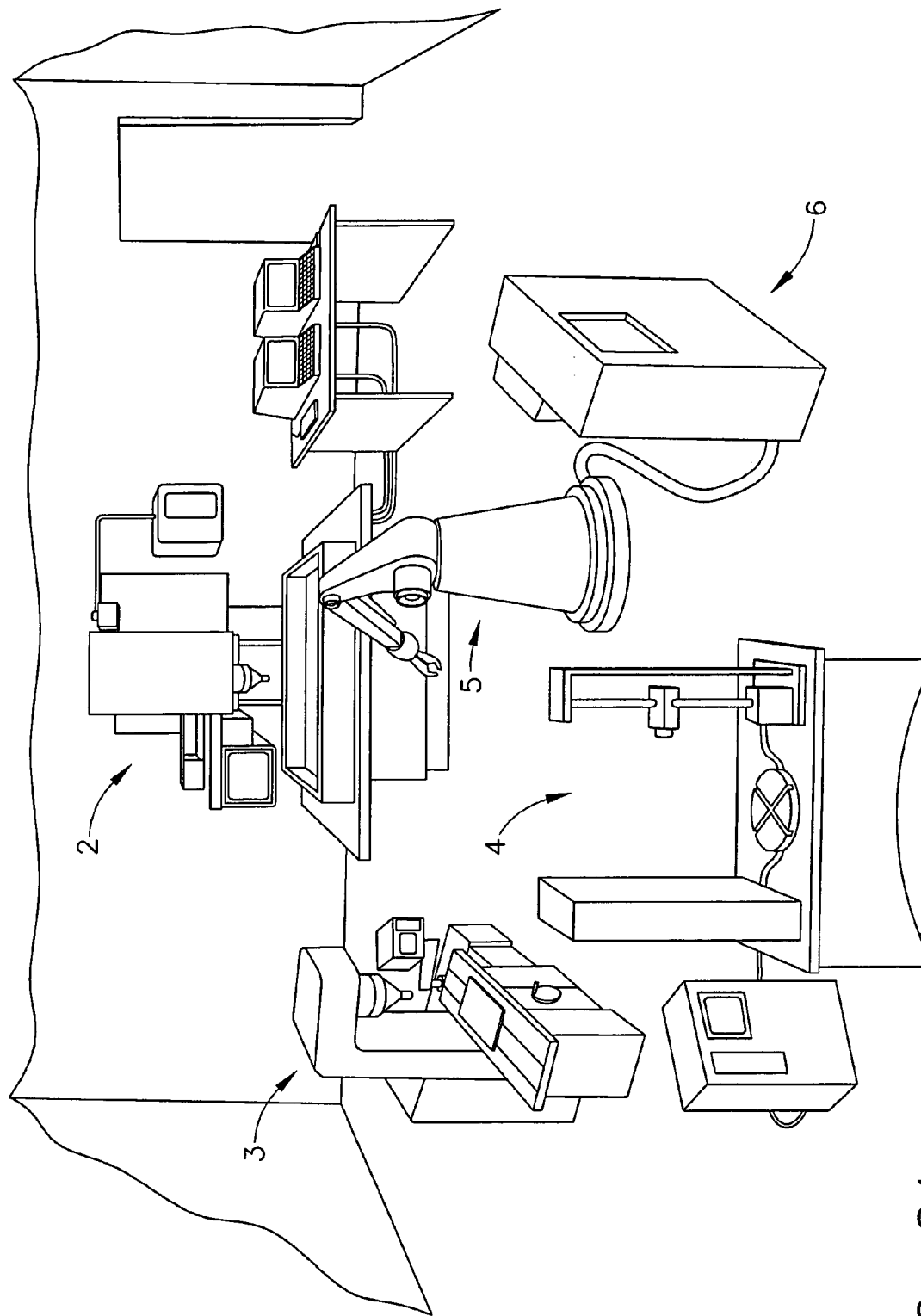
FIG. 21 shows a schematic representation of a manufacturing cell (prior art) showing two metalworking machines, an inspection station, a robot for manipulating workpieces, and a control system.
Figure 22:
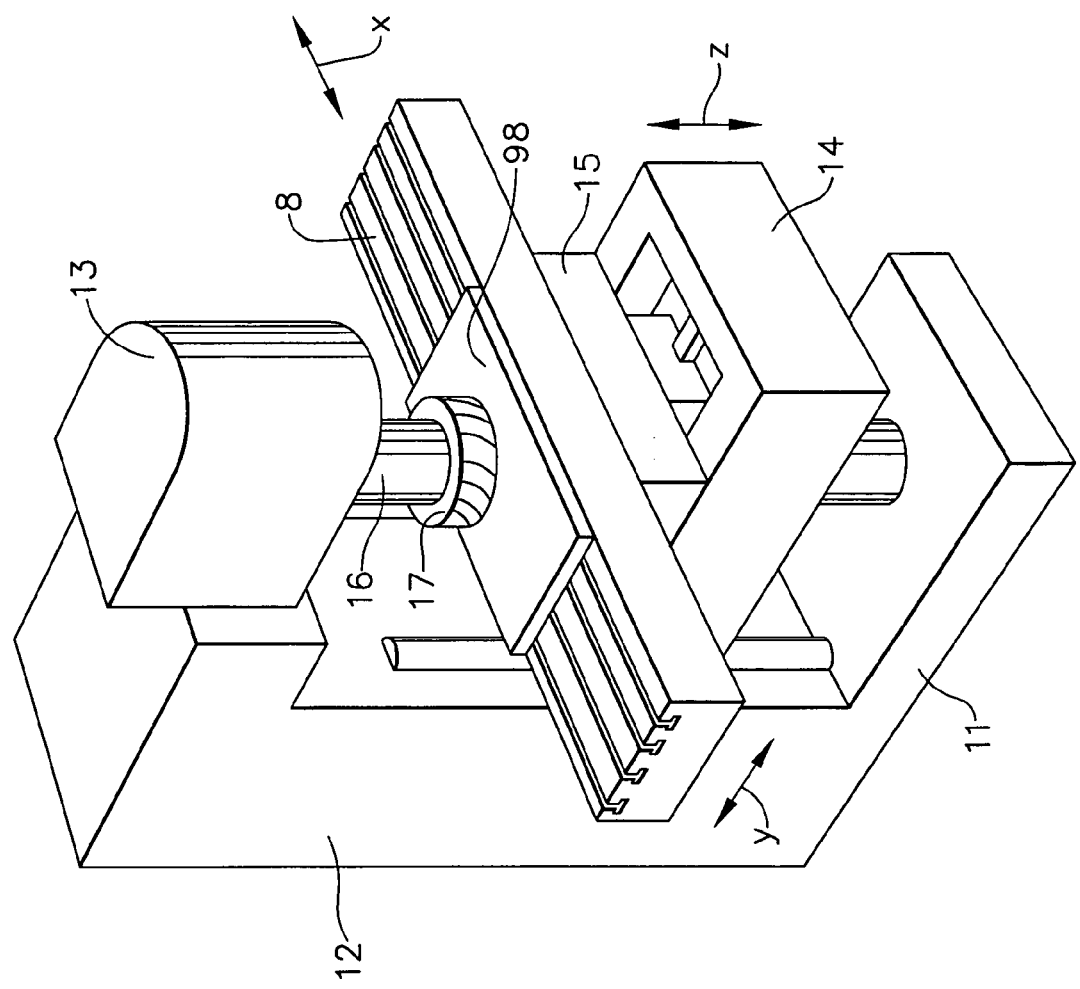
FIG. 22 shows a schematic representation of a milling machine (prior art), illustrating the customary definition of x-, y- and z- direction movement.

A third metalworking machine for use in the manufacturing cell is also a milling machine or machining center, shown at 2 in FIG. 21. This machine can be provided with the modular tooling apparatus shown in FIG. 12, including the securement shown in FIG. 13. As the beveled faces 807 and 808 in this particular workpiece are each disposed at an angle of 45° to the centerline of the part, these faces can be conveniently machined with the same milling cutter, used in an end milling mode for one face and in a side milling mode for the other face.

The bore, shown at 806 in FIG. 13, can be conveniently machined in a turning operation, either immediately following the first turning operation, or following the second milling operation. Alternatively, machining the bore could be done in the second milling machine, shown such as that shown as 2 in FIG. 21, provided that the modular tooling was configured to situate the axis of the workpiece in the z direction (vertical), and provided that the second milling machine was provided with means for quickly changing cutting tools in that milling machine. Other equipment, such as the inspection station shown such as that shown as 4 in FIG. 21, or parts washing apparatus (not shown) can be incorporated in the manufacturing cell. If the workpieces were too large to be conveniently carried by an operator from one metalworking machine to another, a robotic device such as that shown as 5 in FIG. 21 can be employed.

In a variation of this embodiment, a broaching machine could be employed in lieu of the second milling machine.

By employing different sets of inserts in the two milling operations, the manufacturing cell can be quickly modified to accommodate a different member in a family of workpieces. This embodiment of the invention, along with variations therein, illustrates the versatility of the manufacturing cell of the present invention and the modular tooling apparatus employed therein.

The present invention is illustrated with respect to machining centers, or milling machines, but the concepts of the present invention are also applicable to other types of metalworking machines. The present invention can be extended to drilling or boring operations, for machining centers are often employed for such operations. The invention is readily adapted to other manufacturing operations such as broaching or shaping, where a cutting tool is moved past a rigidly supported workpiece, or planing. The concepts of the present invention can also be applied to turning operations. Consider, for example, a family of workpieces, each having a region of irregular shape and another region of circular symmetry that is appropriate for turning. To machine such a part, the workpiece might be secured to the spindle of a lathe, using a four-jaw chuck. In this situation, each workpiece is not only secured in the chuck, but positioned therein, using precision measuring equipment with each workpiece to establish its location and orientation relative to the axis of rotation of the lathe or turning center. One could machine special jaws for a four-jaw chuck, thereby facilitating the location of individual workpieces, but that approach does not address the need for rapid changeover of tooling.

Employing the principles of the present invention would yield a faceplate having threads to engage the threads on the lathe spindle on its reverse side, and a plurality of pockets to engage inserts on its front side. Depending on the nature of the parts being turned, the apparatus might also incorporate hydraulic actuators that would force the inserts against a workpieces.

While specific embodiments of the apparatus and method of the present invention have been described, it will be apparent to those skilled in the metalworking arts that various modifications thereto can be made without departing from the spirit and scope of the present invention as defined in the appended claims.

We claim:

1. A manufacturing cell for performing a plurality of metalworking operations on a workpiece, wherein the manufacturing cell comprises a plurality of work stations, and wherein at least one work station comprises:
   (a) a metalworking machine comprising a table; and
   (b) modular tooling apparatus secured to the table of the metalworking machine, the modular tooling apparatus comprising:
      (i) a base comprising:
         a securement for securing the base to the table of the metalworking machine; and
         at least one attachment surface comprising a locating feature on a surface thereof;
      (ii) at least a first set of inserts comprising a first insert and a second insert alternatively associated with the at least one attachment surface, each of the inserts comprising a locating feature and a workpiece support feature on a surface for alternately supporting a respective first and second workpiece, the first insert and second insert being related in general configuration, but different in detail, the detail being selected from size and proportion, and the first workpiece and second workpiece being related in general configuration, but different in detail, the detail being selected from size and proportion;
   wherein the association of each insert locating feature with the locating feature of the at least one attachment surface defines only one possible characteristic location for each workpiece support feature in a precise position and orientation in x, y and z space relative to the base with accuracy and repeatability, and wherein, when the base is aligned with the metalworking machine and secured to the table, the workpiece support feature of either associated insert supports and holds each of the respective first and second workpieces in a corresponding precise position and orientation in x, y and z space relative to the metalworking machine, for machining of the first workpiece and the second workpiece, without re-aligning the base with the metalworking machine when the first and second inserts are alternately associated with the at least one attachment surface.

2. The manufacturing cell according to claim 1, wherein the modular tooling apparatus further comprises an insert securement.

3. The manufacturing cell according to claim 1, wherein the at least one attachment surface comprises a first attachment surface and a second attachment surface, the first set of inserts being associated with the first attachment surface, and additionally comprising a second set of inserts comprising a first and a second insert, the second set of inserts being associated with the second attachment surface, wherein the first inserts of the first set and second set, alternatively with the second inserts of the first set and second set, associate with the first attachment surface and the second attachment surface, respectively.

4. The manufacturing cell according to claim 1, wherein the workpiece support feature of each insert has a characteristic contour that confronts with and supports the confronting surface of the respective workpiece having a corresponding same characteristic contour.

5. The manufacturing cell according to claim 1 wherein the association of the second insert can support the second workpiece for machining without re-adjusting the metalworking machine.

6. The manufacturing cell according to claim 1 wherein the at least one attachment surface is a pocket.

7. The manufacturing cell according to claim 6, further comprising at least one insert securement for separably securing at least one of the first insert and second insert in the pocket.

8. The manufacturing cell according to claim 6 wherein at least one of the first insert and second insert has a pocket orientation feature whereby the at least one of the first insert and second insert can associate with the pocket in only one orientation.

9. The manufacturing cell according to claim 6 wherein at least one of the first insert and second insert comprises a workpiece orientation feature whereby the first workpiece can be associated with the respective workpiece support feature in only one orientation.

10. A manufacturing cell for performing a plurality of metalworking operations on a workpiece, wherein the manufacturing cell comprises a plurality of work stations, and wherein at least one work station comprises:
   (a) metalworking machine comprising a table; and
   (b) modular tooling apparatus secured to the table of the metalworking machine, the modular tooling apparatus comprising:
      (i) a base comprising:
         a securement for securing the base to the table of the metalworking machine; and
         at least first and second attachment surfaces, each of the attachment surfaces comprising a locating feature on a surface thereof;

(ii) at least a first set of inserts comprising a first insert and a second insert associated with the first and second attachment surfaces, respectively, each of the inserts comprising a locating feature and a workpiece support feature on a surface thereof;

wherein each insert locating feature is configured to associate with the corresponding attachment surface locating feature, thereby defining only one possible characteristic location for each workpiece support feature that provides the workpiece support feature with a precise position and orientation in x, y and z space relative to the base with accuracy and repeatability, and wherein, when the base is aligned with the metalworking machine and secured to the table, the workpiece support features of the associated first and second inserts collectively and cooperatively support and hold a first workpiece in corresponding precise position and orientation in x, y and z space relative to the metalworking machine, for machining of the first workpiece.

11. The manufacturing cell according to claim 10, additionally comprising a second set of inserts that can replace the first set of inserts, the second set of inserts being related in general configuration, but different in detail from the first set of inserts, the detail being selected from size and proportion, for performing a metalworking operation on a second workpiece that is related in general configuration but different in detail from the first workpiece, the detail being selected from size and proportion, and which have corresponding workpiece support features that collectively and cooperatively support and hold the second workpiece in a corresponding precise position and orientation in x, y and z space relative to the metalworking machine, for the proper machining of the second workpiece without re-aligning the base with the metalworking machine.

12. The manufacturing cell according to claim 11, wherein the workpiece support features of each set of inserts have a characteristic contour that confronts with and supports the confronting surface of the respective workpiece having a corresponding same characteristic contour.

13. The manufacturing cell according to claim 10 wherein at least one of the at least first and second attachment surfaces is a pocket.

14. The manufacturing cell according to claim 13, further comprising at least one insert securement for separably securing at least one of the first insert and second insert in the pocket.

15. The manufacturing cell according to claim 13 wherein at least one of the first insert and second insert has a pocket orientation feature whereby the at least one of the first insert and second insert can associate with the pocket in only one orientation.

16. The manufacturing cell according to claim 13 wherein at least one of the first insert and second insert comprises a workpiece orientation feature whereby the first workpiece can be associated with the respective workpiece support feature in only one orientation.

* * * * *